US011182887B2

United States Patent
Kang et al.

(10) Patent No.: US 11,182,887 B2
(45) Date of Patent: Nov. 23, 2021

(54) METHOD OF PROCESSING IMAGES USING HIGH DYNAMIC RANGE WHILE PRESERVING FRAME RATE AND IMAGE PROCESSING DEVICE PERFORMING THE SAME

(71) Applicant: Samsung Electronics Co., Ltd., Suwon-si (KR)

(72) Inventors: Jin-Woo Kang, Hwaseong-si (KR); Seong-Wook Song, Seoul (KR); Hye-Yun Jung, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 170 days.

(21) Appl. No.: 16/527,563

(22) Filed: Jul. 31, 2019

(65) Prior Publication Data
US 2020/0219240 A1 Jul. 9, 2020

(30) Foreign Application Priority Data

Jan. 7, 2019 (KR) ........................ 10-2019-0001728

(51) Int. Cl.
*G06T 7/00* (2017.01)
*G06T 5/50* (2006.01)
*G06T 7/20* (2017.01)

(52) U.S. Cl.
CPC .................. *G06T 5/50* (2013.01); *G06T 7/20* (2013.01); *G06T 2207/10016* (2013.01); *G06T 2207/20208* (2013.01); *G06T 2207/20221* (2013.01)

(58) Field of Classification Search
CPC .. H04N 5/2355; H04N 5/2353; H04N 5/2356; H04N 5/35581; H04N 5/35554; G06T 2207/10144; G06T 5/50; G06T 2207/20208; G06T 2207/10016;
(Continued)

(56) References Cited

U.S. PATENT DOCUMENTS 8,488,016 B2   7/2013   Nagataki et al.
9,131,172 B2   9/2015   Tsuzuki
9,460,532 B2   10/2016  Yamaguchi et al.
(Continued)

FOREIGN PATENT DOCUMENTS

JP   2018-0042089 A   3/2018

OTHER PUBLICATIONS

Kang, Sing Bing, et al. "High dynamic range video." ACM Transactions on Graphics (TOG) 22.3 (2003): 319-325. (Year: 2003).*

*Primary Examiner* — Li Liu
(74) *Attorney, Agent, or Firm* — Harness, Dickey & Pierce, P.L.C.

(57) ABSTRACT

In a method of processing an image which is a video image including a plurality of frame images, a first high dynamic range (HDR) image is generated by combining a first frame image and a second frame image subsequent to the first frame image. The first and second frame images are included in the plurality of frame images. The first frame image has a first exposure time. The second frame image has a second exposure time different from the first exposure time. A second HDR image is generated by combining the second frame image and a third frame image subsequent to the second frame image. The third frame image is included in the plurality of frame images and has the first exposure time.

12 Claims, 21 Drawing Sheets

(58) Field of Classification Search
CPC ........... G06T 5/007; G06T 2207/20221; G06T 2207/20212
See application file for complete search history.

(56) References Cited

U.S. PATENT DOCUMENTS

| | | | |
|---|---|---|---|
| 9,544,506 B1 * | 1/2017 | Wang | H04N 5/2355 |
| 10,097,765 B2 | 10/2018 | Sheikh et al. | |
| 10,298,949 B2 * | 5/2019 | Condorovici | H04N 19/51 |
| 2004/0130649 A1 * | 7/2004 | Lee | H04N 5/23212 |
| | | | 348/345 |
| 2006/0109385 A1 * | 5/2006 | Wakako | H04N 21/44016 |
| | | | 348/731 |
| 2014/0307960 A1 * | 10/2014 | Sharma | H04N 5/23229 |
| | | | 382/162 |
| 2015/0312463 A1 * | 10/2015 | Gupta | H04N 5/2355 |
| | | | 348/239 |
| 2016/0381302 A1 * | 12/2016 | Shikata | H04N 5/2356 |
| | | | 348/239 |
| 2018/0167544 A1 * | 6/2018 | Jeong | H04N 5/35581 |
| 2018/0302544 A1 | 10/2018 | Dhiman et al. | |
| 2020/0211166 A1 * | 7/2020 | Yao | G06T 5/009 |

* cited by examiner

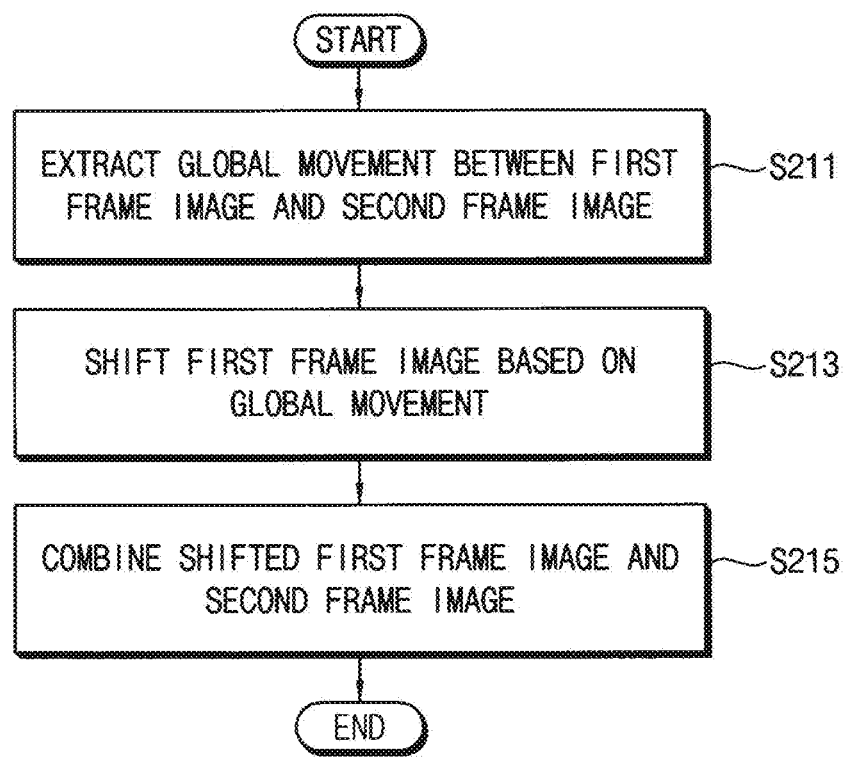

FIG. 5A
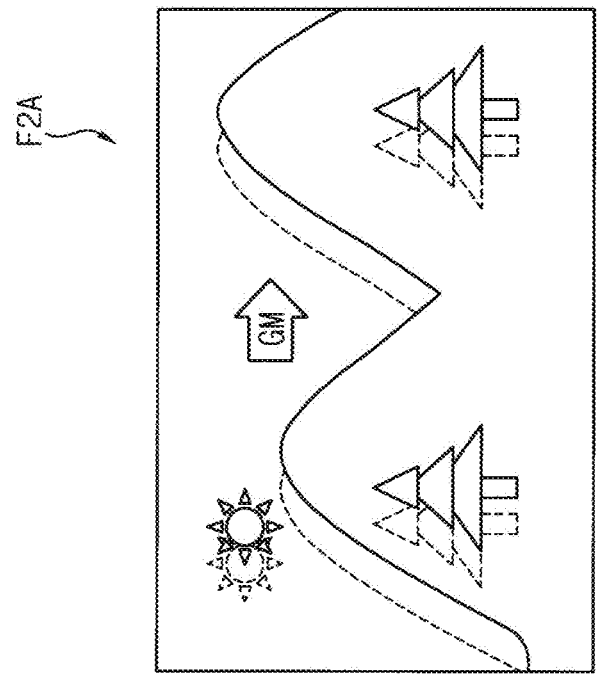
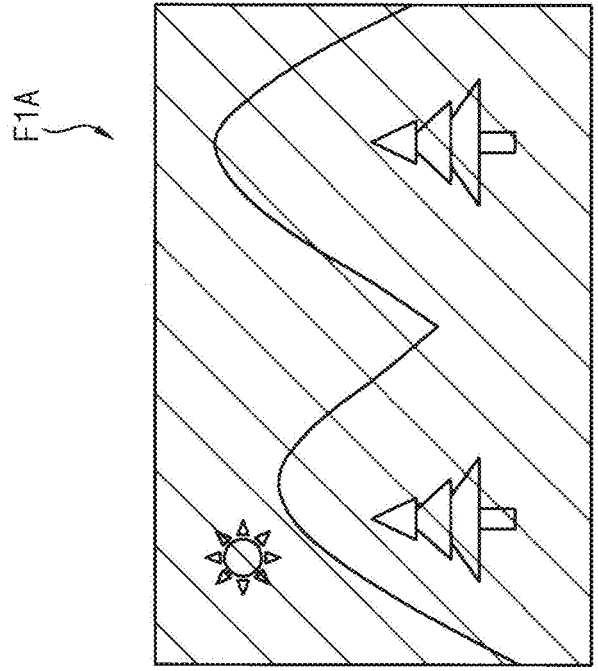

FIG. 7A
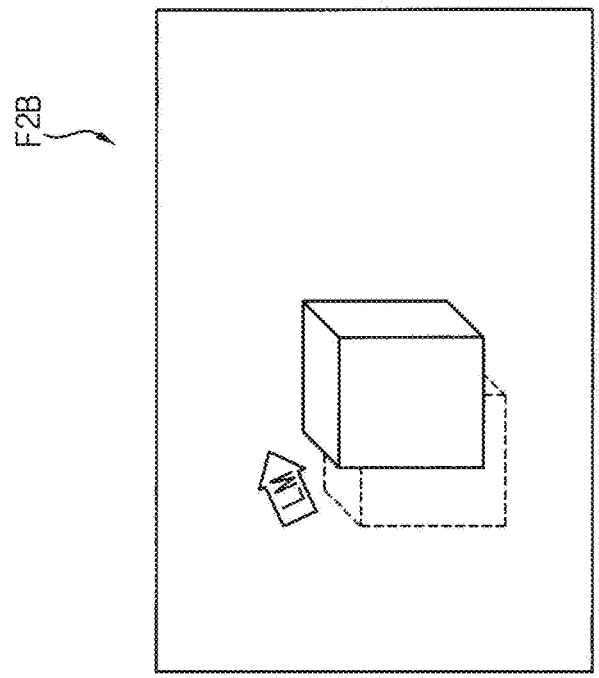
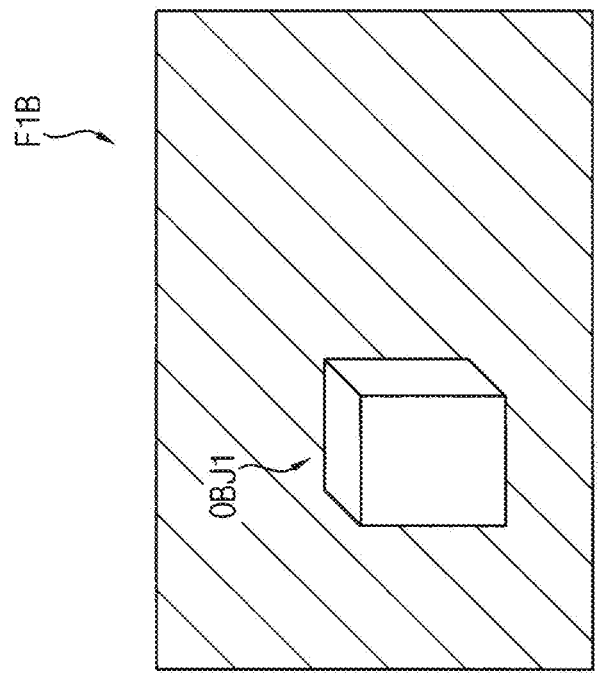

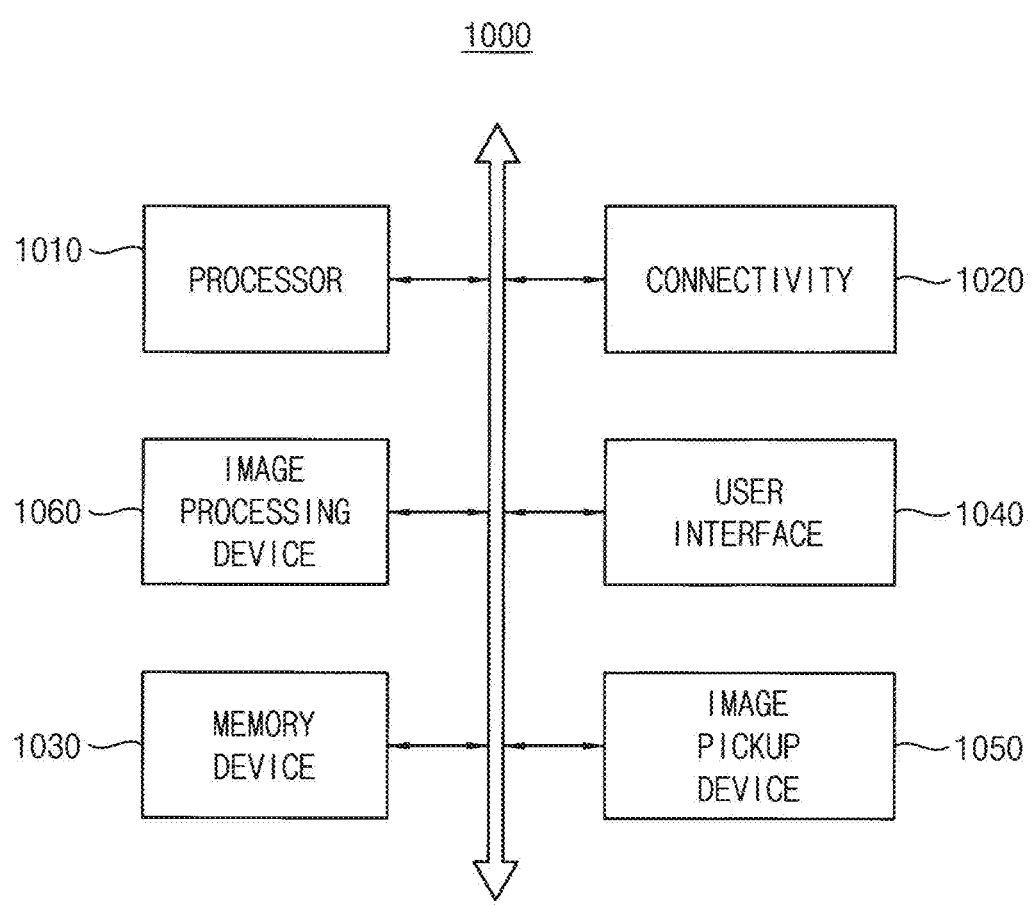

METHOD OF PROCESSING IMAGES USING HIGH DYNAMIC RANGE WHILE PRESERVING FRAME RATE AND IMAGE PROCESSING DEVICE PERFORMING THE SAME

CROSS-REFERENCE TO RELATED APPLICATION

This application claims priority under 35 USC § 119 to Korean Patent Application No. 10-2019-0001728, filed on Jan. 7, 2019 in the Korean Intellectual Property Office (KIPO), the contents of which are herein incorporated by reference in their entirety.

BACKGROUND

1. Technical Field

Example embodiments relate generally to image obtaining and processing. For example, at least some example embodiments relate to methods of processing images that acquire high quality video images, and/or image processing devices that perform the methods.

2. Description of the Related Art

Image recording devices (e.g., cameras) have been adopted in various electronic systems and mobile systems such as, for example, computers, mobile phones, tablets, virtual reality (VR) equipment, and robotic systems. When a subject is photographed using a camera, if a background of the subject is too bright, the subject is relatively dark, which is called back light. A back light compensation (BLC) may be utilized to acquire a better quality image. A high dynamic range (HDR) technology combines an image in which a bright area is clearly seen by controlling exposure thereof and different images in which dark areas are clearly seen by controlling exposure thereof, and generates an image in which bright and dark areas are very clearly seen. However, when combining images using conventional HDR technology, frame rate loss may occur as the number of combined frames increases.

SUMMARY

At least one example embodiment of the present disclosure provides a method of processing an image capable of efficiently generating HDR images from a video image without loss of a frame rate.

At least one example embodiment of the present disclosure provides an image processing device capable of efficiently generating HDR images from a video image without loss of a frame rate.

Some example embodiments relate to a method of image processing a video image including a plurality of frame images. In some example embodiments, the method may include generating a first high dynamic range (HDR) image based on a first frame image and a second frame image of the plurality of frame images, the second frame image being subsequent in time to the first frame image in the plurality of frame images, the first frame image having a first exposure time, the second frame image having a second exposure time different from the first exposure time; and generating a second HDR image based on the second frame image and a third frame image of the plurality of frame images, the third frame image being subsequent in time to the second frame image in the plurality of frame images, the third frame image having the first exposure time.

Some example embodiments relate to an image processing device configured to perform image processing on a video image including a plurality of frame images including a first frame image, a second frame image and a third frame image. In some example embodiments, the image processing device may include a first frame buffer configured to, receive the first frame image, the first frame image having a first exposure time, and receive the third frame image, the third frame image being subsequent in time to the second frame image in the plurality of frame images, the third frame image having the first exposure time; a second frame buffer configured to receive the second frame image, the second frame image being subsequent in time to the first frame image in the plurality of frame images, the second frame image having a second exposure time different from the first exposure time; and a high dynamic range (HDR) processor configured to, generate a first HDR image based on the first frame image and the second frame image, and generate a second HDR image based on the second frame image and the third frame image.

Some example embodiments relate to a method of image processing a video image including a plurality of frame images. In some example embodiments, the method includes generating a first high dynamic range (HDR) image based on a first frame image and a second frame image of the plurality of frame images, the second frame image being subsequent in time to the first frame image, the first frame image having a first exposure time, the second frame image having a second exposure time different from the first exposure time; and generating a second HDR image based on the first HDR image and a third frame image of the plurality of frame images, the third frame image being subsequent in time to the second frame image, the third frame image having the first exposure time.

Some example embodiments relate to an image processing device configured to perform image processing on a video image including a plurality of frame images, the plurality of frame images including a first frame image, a second frame image and a third frame image. In some example embodiments, the image processing device includes a first frame buffer configured to, receive the first frame image having a first exposure time, receive the second frame image, the second frame image being subsequent in time to the first frame image in the plurality of frame images, the second frame image having a second exposure time different from the first exposure time, and receive the third frame image having the first exposure time, the third frame image being subsequent in time to the second frame image in the plurality of frame image; a high dynamic range (HDR) processor configured to, generate a first HDR image based on the first frame image and the second frame image, and generate a second HDR image based on the first HDR image and the third frame image; and a second frame buffer configured to receive the first HDR image and the second HDR image.

In the method of processing the image and the image processing device according to example embodiments, the HDR images may be generated based on one of the sliding window scheme and the IIR scheme. Accordingly, the HDR video image may be efficiently generated while preserving the frame rate of the original video image without loss of the frame rate.

BRIEF DESCRIPTION OF THE DRAWINGS

Illustrative, non-limiting example embodiments will be more clearly understood from the following detailed description taken in conjunction with the accompanying drawings.

FIG. 4 is a flowchart illustrating an example of generating a first HDR image in FIG. 2.

FIGS. 5A and 5B are diagrams for describing an operation of generating a first HDR image in FIG. 4.

FIGS. 7A and 7B are diagrams for describing an operation of generating a first HDR image in FIG. 6.

FIG. 20 is a block diagram illustrating an electronic system according to example embodiments.

DETAILED DESCRIPTION

Figure 1:
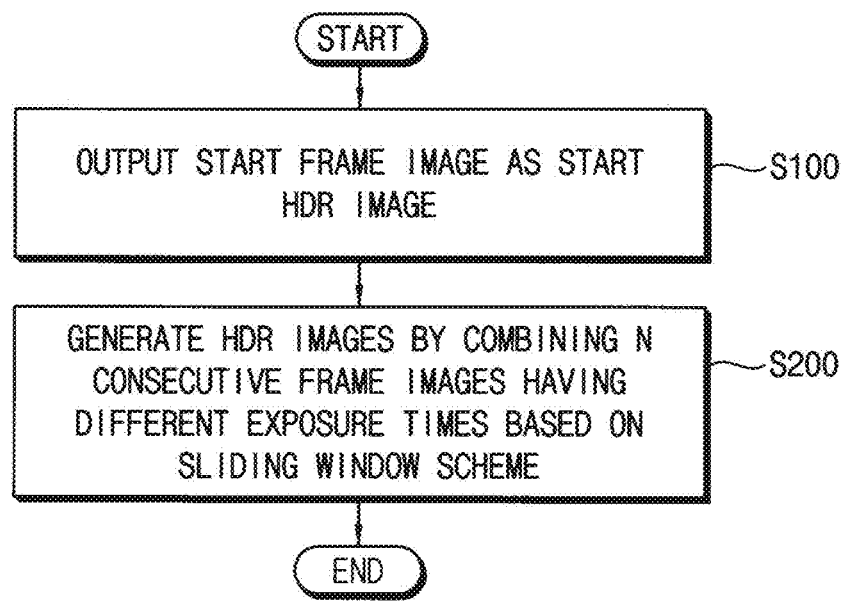
FIG. 1 is a flowchart illustrating a method of processing an image according to example embodiments.

Various example embodiments will be described more fully with reference to the accompanying drawings, in which embodiments are shown. The present disclosure may, however, be embodied in many different forms and should not be construed as limited to the example embodiments set forth herein. Like reference numerals refer to like elements throughout this application.

FIG. 1 is a flowchart illustrating a method of processing an image according to example embodiments.

Referring to FIG. 1, a method of processing an image according to example embodiments is performed or executed on a video image including a plurality of frame images. In other words, the image to be processed is the video image including the plurality of frame images. Particularly, the method of processing the image according to example embodiments is applied or employed to obtain or acquire a high dynamic range (HDR) video image by generating a plurality of HDR images based on the plurality of frame images without loss of a frame rate or with lossless frame rate.

In the method of processing the image according to example embodiments, in operation S100, a start frame image is output as a start HDR image without performing any image processing, compositing or synthesis. The start frame image is included in the plurality of frame images and arranged at the head or front of the plurality of frame images. The start HDR image is included in the plurality of HDR images and arranged at the head or front of the plurality of HDR images.

In operation S200, each of HDR images is generated by combining, mixing, compositing or synthesizing N frame images among the plurality of frame images based on a sliding window scheme, where N is a natural number greater than or equal to two. The N frame images are consecutive or successive frame images among the plurality of frame images and have different exposure times.

The sliding window scheme is a data transmission of transfer method based on a "window" having a desired (or, alternatively, a predetermined) size. For example, when a series of data are to be transmitted, all packets included in the window may be transmitted, the window may be slid by a desired (or, alternatively, a predetermined) unit after the transmission of the packets is completed, and then next packets included in the slid window may be transmitted. Similarly, the sliding window scheme may be applied or employed to generate the HDR images in the method of processing the image according to example embodiments. For example, one HDR image may be generated using consecutive frame images that are included in a "window" having a desired (or, alternatively, a predetermined) size (e.g., the number N), the window may be slid by one frame, and then another HDR image may be generated using other consecutive frame images that are included in the slid window. An image processing operation based on the sliding window scheme and a configuration of an image processing device for performing the image processing operation will be described with reference to FIGS. 2 through 12.

In some example embodiments, the number N that represents a size of the window and the number of frame images combined at one time may be substantially equal to the number of different exposure times included in the plurality of frame images.

When the HDR images are generated based on K frame images and the above-described sliding window scheme with the window having the size N, the number of the generated HDR images may be (K-N+1) other than K, where K is a natural number greater than or equal to N. Thus, as described in operation S100, the start HDR image may be provided by outputting the start frame image as it is without being combined, mixed, composited or synthesized such that the number of input frame images is substantially equal to the number of output HDR images (e.g., the frame rate is maintained).

Figure 2:
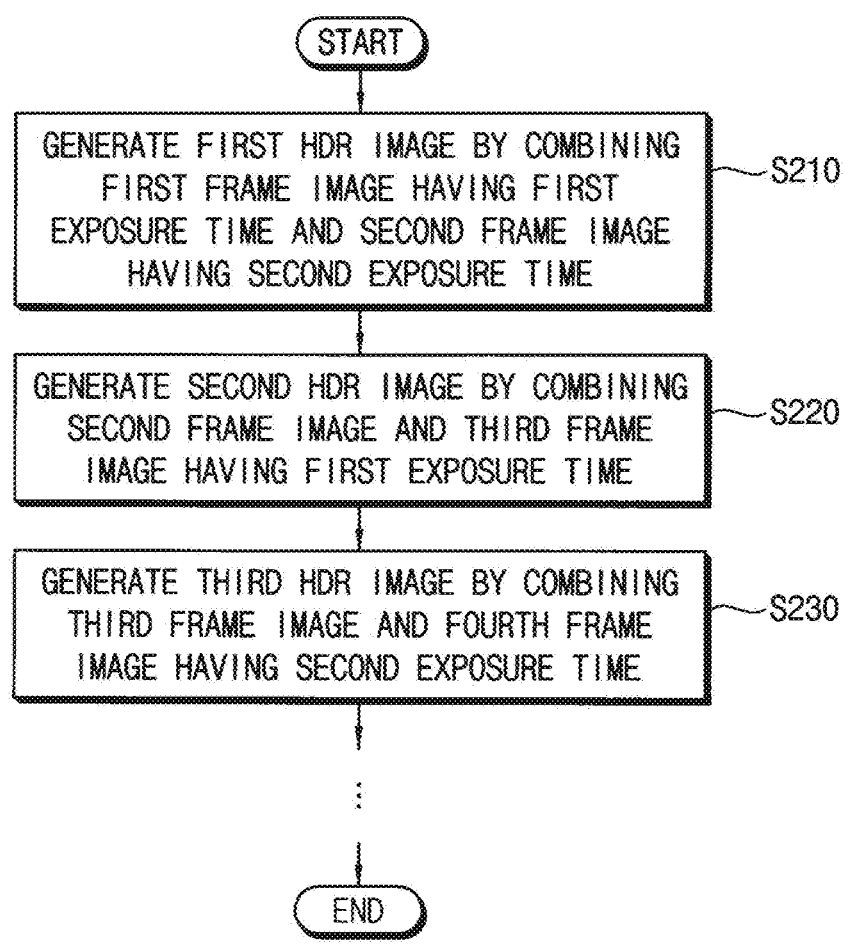
FIG. 2 is a flowchart illustrating an example of generating HDR images in FIG. 1.
Figure 3:
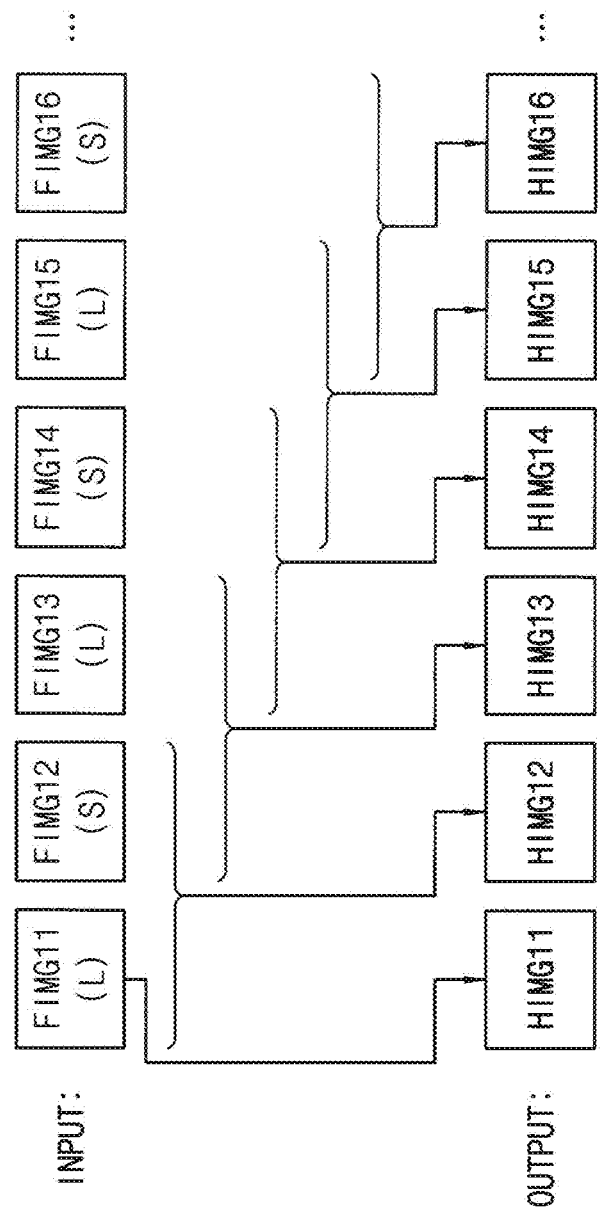
FIG. 3 is a diagram for describing an operation of generating HDR images in FIG. 2.

FIG. 2 is a flowchart illustrating an example of generating HDR images in FIG. 1. FIG. 3 is a diagram for describing an operation of generating HDR images in FIG. 2.

FIGS. 2 and 3 illustrate an example where the size of the window and the number of the different exposure times are two, e.g., N=2. In FIG. 3, a plurality of frame images FIMG11, FIMG12, FIMG13, FIMG14, FIMG15, FIMG16, . . . that are included in a video image (e.g., an input image) may be provided from an image sensor, a memory device, or the like. The frame images FIMG11, FIMG13 and FIMG15 having a first exposure time L (e.g., a long exposure time) and the frame images FIMG12, FIMG14 and FIMG16 having a second exposure time S (e.g., a short exposure time) may be alternately repeated.

Referring to FIGS. 1, 2 and 3, as described with reference to operation S100, a start frame image or first frame image FIMG11 that is arranged at the head of the plurality of frame images FIMG11, FIMG12, FIMG13, FIMG14, FIMG15 and FIMG16 may be output as a start HDR image HIMG11 among a plurality of HDR images HIMG11, HIMG12, HIMG13, HIMG14, HIMG15, HIMG16, . . . that are included in an HDR video image (e.g., an output image) without performing any image processing.

After then, as described with reference to operation S200, when generating the remainder HDR images HIMG12, HIMG13, HIMG14, HIMG15 and HIMG16 other than the start HDR image HIMG11 among the plurality of HDR images HIMG11, HIMG12, HIMG13, HIMG14, HIMG15 and HIMG16, two consecutive frame images having different exposure times L and S may be sequentially combined by the sliding window scheme using a window having a size of 2.

Operation S200 may include operations S210 to S230. For example, in operation S210, a first HDR image HIMG12 may be generated by combining the first frame image FIMG11 having the first exposure time L and a second frame image FIMG12 having the second exposure time S.

The second frame image FIMG12 may be a frame image subsequent to the first frame image FIMG11. For example, the first frame image FIMG11 and the second frame image FIMG12 may be two consecutive frame images. The second exposure time S may be different from the first exposure time L. For example, the first exposure time L may be a relatively long time interval, and the second exposure time S may be a relatively short time interval. For example, the first frame image FIMG11 having the first exposure time L that is a relatively long time interval may be a relatively high luminance or brightness image, and the second frame image FIMG12 having the second exposure time S that is a relatively short time interval may be a relatively low luminance or brightness image.

As described above, since the input image is a video image, the first frame image FIMG11 and the second frame image FIMG12 may not completely display the same scene, and thus a scene change, a scene movement and/or an object movement may occur between the first frame image FIMG11 and the second frame image FIMG12. Thus, it is necessary to combine the first frame image FIMG11 and the second frame image FIMG12 in consideration of the scene change, the scene movement and/or the object movement. Detailed operations of combining the first frame image FIMG11 and the second frame image FIMG12 will be described with reference to FIGS. 4 and 6.

After operation S210 is complete, in operation S220, a second HDR image HIMG13 may be generated by combining the second frame image FIMG12 and a third frame image FIMG13 having the first exposure time L. The second HDR image HIMG13 may be an HDR image subsequent to the first HDR image HIMG12, and the third frame image FIMG13 may be a frame image subsequent to the second frame image FIMG12. In other words, the window may be slid or shifted by one frame after operation S210 is completed, and then operation S220 may be performed using the slid window.

Similarly, in operation S230, a third HDR image HIMG14 subsequent to the second HDR image HIMG13 may be generated by combining the third frame image FIMG13 and a fourth frame image FIMG14 subsequent to the third frame image FIMG13 and having the second exposure time S.

In addition, as illustrated in FIG. 3, a fourth HDR image HIMG15 subsequent to the third HDR image HIMG14 may be generated by combining the fourth frame image FIMG14 and a fifth frame image FIMG15 subsequent to the fourth frame image FIMG14 and having the first exposure time L. A fifth HDR image HIMG16 subsequent to the fourth HDR image HIMG15 may be generated by combining the fifth frame image FIMG15 and a sixth frame image FIMG16 subsequent to the fifth frame image FIMG15 and having the second exposure time S.

As described above, when the HDR images are generated by combining the frame images based on the sliding window scheme, the number of the plurality of frame images FIMG11, FIMG12, FIMG13, FIMG14, FIMG15 and FIMG16 that are included in the input image and received before the image processing operation may be substantially equal to the number of the plurality of HDR images HIMG11, HIMG12, HIMG13, HIMG14, HIMG15 and HIMG16 that are included in the output image and obtained after the image processing operation. Thus, the HDR video image or the HDR images included in the HDR video image may be efficiently generated without loss of the frame rate or with lossless frame rate.

Figure 5B:
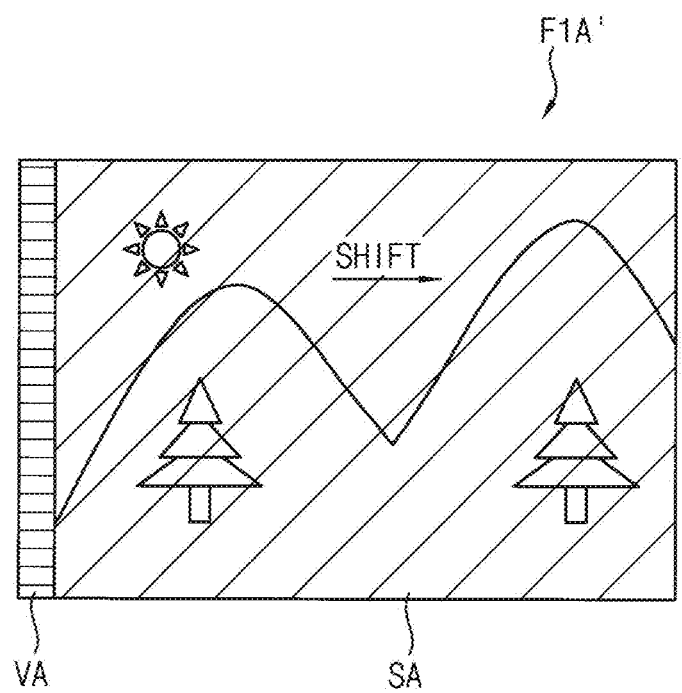

FIG. 4 is a flowchart illustrating an example of generating a first HDR image in FIG. 2. FIGS. 5A and 5B are diagrams for describing an operation of generating a first HDR image in FIG. 4.

Referring to FIGS. 2, 3, 4, 5A and 5B, in some example embodiments, operation S210 of generating the first HDR image may include operations S211, S213 and S215.

In operation S211, a global movement or motion between the first frame image and the second frame image may be extracted.

For example, FIG. 5A illustrates a first frame image F1A and a second frame image F2A that are examples of the first frame image FIMG11 and the second frame image FIMG12 in FIG. 3, respectively. The first frame image F1A in FIG. 5A is illustrated with the hatch lines to indicate the difference in exposure time. For example, the first frame image F1A illustrated with the hatch lines may have the first exposure time L, and the second frame image F2A illustrated without the hatch lines may have the second exposure time S different from the first exposure time L.

In FIG. 5A, when compared with the first frame image F1A, the second frame image F2A may have a scene including the sun, mountains and trees as a whole shifted or moved to the right direction. The dotted lines in the second frame image F2A in FIG. 5A may indicate positions of the sun, mountains and trees in the first frame image F1A. A global movement GM between the first frame image F1A and the second frame image F2A may be extracted by comparing and/or analyzing the first frame image F1A and the second frame image F2A. For example, the global movement GM may be obtained as a form of a global motion vector.

In operation S213, the first frame image may be shifted based on the extracted global movement.

For example, a shifted first frame image F1A' in FIG. 5B may be obtained by shifting the first frame image F1A in FIG. 5A to the right direction. By the shift operation as described above, the shifted first frame image F1A' may include a shifted area SA and a virtual area VA. The shifted area SA may be substantially the same as a portion of the first frame image F1A. The virtual area VA may be a portion that is not actually included in the first frame image F1A. For example, the virtual area VA may be obtained by performing an image interpolation, or the like based on the first frame image F1A. For another example, when a size of the virtual area VA is relatively small, the virtual area VA may be obtained by copying a portion of the first frame image F1A as it is, or may be empty without any image processing.

In operation S215, the shifted first frame image and the second frame image may be combined with each other.

For example, the first HDR image may be obtained by combining the shifted first frame image F1A' in FIG. 5B and the second frame image F2A in FIG. 5A, and thus the distortion, deterioration or degradation of the first HDR image may be reduced (or, alternatively, prevented).

Although FIGS. 4, 5A and 5B illustrate an example where the first frame image is shifted with respect to the second frame image and the shifted first frame image and the second frame image are combined with each other (e.g., an example where the second frame image that is input later than the first frame image is used as a reference image), example embodiments are not limited thereto. For example, the second frame image may be shifted with respect to the first frame image that is input prior to the second frame image, and the first frame image and the shifted second frame image may be combined with each other to generate the first HDR image. When the first frame image that is input prior to the second frame image is used as a reference image as described above, the extracted global movement may be considered to perform the image combining operation, and a frame delay associated with an input of the second frame image that is input later than the first frame image may be additionally considered to perform the image combining operation.

Figure 6:
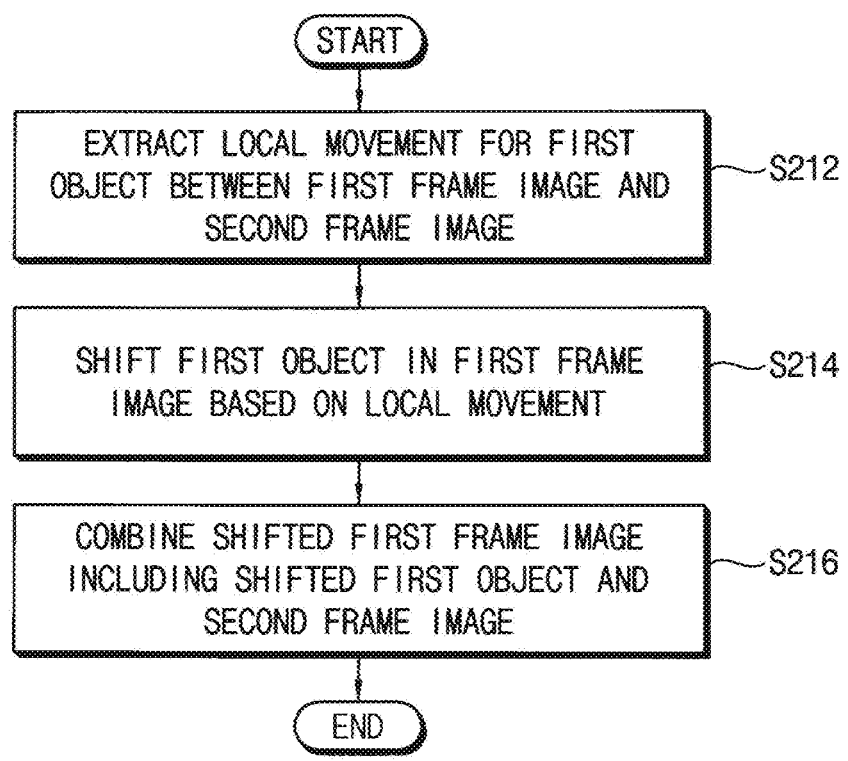
FIG. 6 is a flowchart illustrating another example of generating a first HDR image in FIG. 2.
Figure 7B:
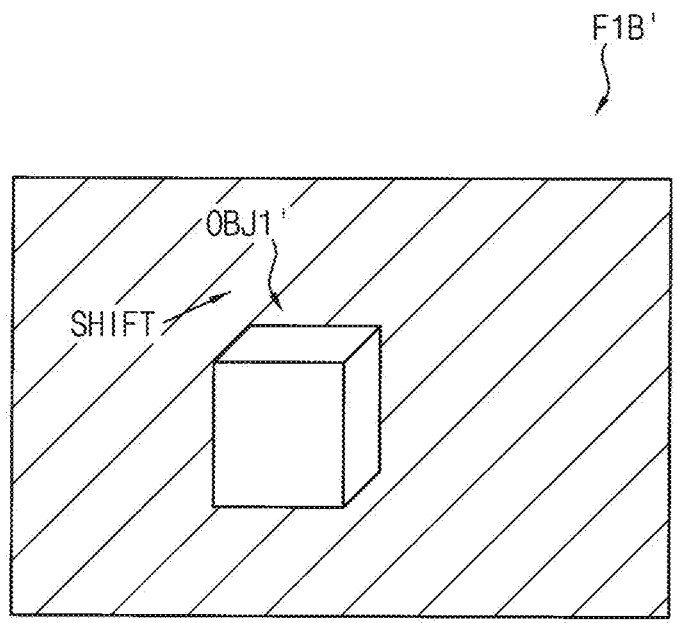

FIG. 6 is a flowchart illustrating another example of generating a first HDR image in FIG. 2. FIGS. 7A and 7B are diagrams for describing an operation of generating a first HDR image in FIG. 6.

Referring to FIGS. 2, 3, 6, 7A and 7B, in some other example embodiments, operation S210 of generating the first HDR image may include operations S212, S214 and S216.

In operation S212, a local movement or motion for a first object between the first frame image and the second frame image may be extracted. The first object may be one of a plurality of objects included in the first frame image and the second frame image.

For example, FIG. 7A illustrates a first frame image F1B and a second frame image F2B that are other examples of the first frame image FIMG11 and the second frame image FIMG12 in FIG. 3, respectively. As with that described with reference to FIG. 5A, the first frame image F1B in FIG. 7A is illustrated with the hatch lines to indicate the difference in exposure time.

In FIG. 7A, when compared with the first frame image F1B, the second frame image F2B may include a first object OBJ1 moved or shifted to the right direction. The dotted lines in the second frame image F2B in FIG. 7A may indicate a position of the first object OBJ1 in the first frame image F1B. The remaining portion of the image (e.g., a background) other than the first object OBJ1 may not be shifted, or may be displayed substantially the same without any difference between the first frame image F1B and the second frame image F2B even if it is shifted. A local movement LM for the first object OBJ1 between the first frame image FIB and the second frame image F2B may be extracted by comparing and/or analyzing the first frame image F1B and the second frame image F2B. For example, the local movement LM may be obtained as a form of a local motion vector.

In operation S214, the first object in the first frame image may be shifted based on the extracted local movement.

For example, a shifted first frame image F1B' in FIG. 7B including a shifted first object OBJ1' may be obtained by shifting the first object OBJ1 included in the first frame image F1B in FIG. 7A to the right direction. Although not illustrated in FIG. 7B, as with that described with reference to FIG. 5B, the shifted first frame image F1B' including the shifted first object OBJ1' may include a virtual area by shifting the first object OBJ1', and the virtual area may be obtained by performing an image interpolation based on the first frame image F1B, may be obtained by copying a portion of the first frame image F1B as it is, or may be empty without any image processing.

In operation S216, the shifted first frame image including the shifted first object and the second frame image may be combined with each other.

For example, the first HDR image may be obtained by combining the shifted first frame image F1B' in FIG. 7B including the shifted first object OBJ1' and the second frame image F2B in FIG. 7A, and thus the distortion, deterioration or degradation of the first HDR image may be reduced (or, alternatively, prevented).

Although FIGS. 6, 7A and 7B illustrate an example where the first frame image and the second frame image include one object, example embodiments are not limited thereto. For example, the first frame image and the second frame image may include two or more objects. When the first frame image and the second frame image include two or more objects, each of local movements may be extracted for a respective one of the objects, each of the objects in the first frame image may be shifted based on a respective one of the local movements, and the shifted first frame image including the shifted objects and the second frame image may be combined with each other.

In addition, although FIGS. 6, 7A and 7B illustrate an example where the first object in the first frame image is shifted with respect to the second frame image and the shifted first frame image including the shifted first object and the second frame image are combined with each other (e.g., an example where the second frame image that is input later than the first frame image is used as a reference image), example embodiments are not limited thereto. For example, the first object in the second frame image may be shifted with respect to the first frame image that is input prior to the second frame image, and the first frame image and the shifted second frame image including the shifted first object may be combined with each other to generate the first HDR image.

Although a first scheme for extracting the global movement between two consecutive frame images and performing the image combining operation based on the global movement is described with reference to FIGS. 4, 5A and 5B, and although a second scheme for extracting the local movement for the object between two consecutive frame images and performing the image combining operation based on the local movement is described with reference to FIGS. 6, 7A and 7B, example embodiments are not limited thereto. For example, both the first scheme and the second scheme may be used at one time to perform the image combining operation. In addition, at least one of various algorithms for synthesizing frame images may be additionally used to perform the image combining operation.

Although not illustrated in FIGS. 4, 5A, 5B, 6, 7A and 7B, an operation of generating each of the remainder HDR images other than the first HDR image may be substantially the same as an operation of generating the first HDR image. For example, the first scheme described with reference to FIGS. 4, 5A and 5B may be used to perform the image combining operation, the second scheme described with reference to FIGS. 6, 7A and 7B may be used to perform the image combining operation, or both the first scheme and the second scheme may be used at one time to perform the image combining operation.

Figure 8:
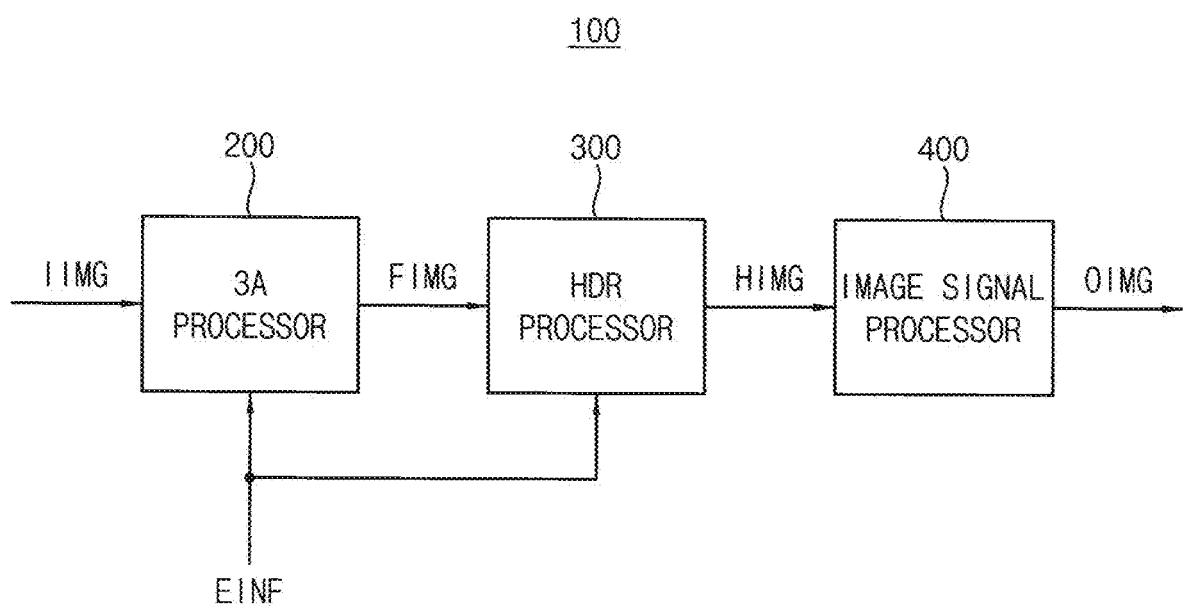
FIG. 8 is a block diagram illustrating an image processing device according to example embodiments.

FIG. 8 is a block diagram illustrating an image processing device according to example embodiments.

Referring to FIG. 8, an image processing device 100 includes an HDR processor 300. The image processing device 100 may further include a three-automation (3A) processor 200 and an image signal processor 400.

The HDR processor 300 is located or disposed between the 3A processor 200 and the image signal processor 400, and performs a multi-frame processing operation. The HDR processor 300 receives exposure time information EINF, and performs the method of processing the image according to example embodiments.

In other example embodiments, as described with reference to FIGS. 1 through 7, and as will be described with reference to FIGS. 10 and 11, the HDR processor 300 may generate a plurality of HDR images HIMG by sequentially combining a plurality of frame images FIMG having different exposure times based on the sliding window scheme.

In other example embodiments, as will be described with reference to FIGS. 13 through 15, 17 and 18, the HDR processor 300 may generate the plurality of HDR images HIMG by sequentially combining the plurality of frame images FIMG having different exposure times based on an infinite impulse response (IIR) scheme.

The HDR processor 300 may be implemented with at least two frame buffers. Detailed configurations of the HDR processor 300 will be described with reference to FIGS. 9, 12 and 16.

The 3A processor 200 may receive the exposure time information EINF, and may perform a three-automation (3A) operation on a plurality of input images IIMG to generate the plurality of frame images FIMG. An auto focusing (or auto focus (AF)) operation, an auto white balancing (or auto white (color) balance (AWB)) operation and an auto exposing (or auto exposure (AE)) operation as performed may collectively be referred to as performing the 3A operation. As with the plurality of frame images FIMG, the plurality of input images IIMG may also have different exposure times. The plurality of input images IIMG may be provided from an external image pickup device (e.g., an image pickup device 1050 in FIG. 20) such as an image sensor, and/or an external memory device (e.g., a memory device 1030 in FIG. 20).

The 3A processor 200 and the HDR processor 300 may share the exposure time information EINF, and an HDR gain compensation may be performed by the 3A processor 200 and the HDR processor 300 based on the exposure time information EINF.

The image signal processor 400 may perform an additional image processing, e.g., image interpolation, color correction, gamma correction, color conversion, or the like, on the plurality of HDR images HIMG to generate a plurality of output images OIMG. As with the plurality of HDR images HIMG, each of the plurality of output images OIMG may also be an HDR image. The plurality of output images OIMG may be provided to an external user interface (e.g., a user interface 1040 in FIG. 20) such as a display device.

The image processing device 100 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

For example, in some example embodiments, at least a part of the 3A processor 200, the HDR processor 300 and the image signal processor 400 in FIG. 8 may be implemented as hardware. For example, at least a part of the elements included in the image processing device 100 according to example embodiments may be included in a computer-based electronic system.

In other example embodiments, at least a part of the 3A processor 200, the HDR processor 300 and the image signal processor 400 in FIG. 8 may be implemented as instruction codes or program routines (e.g., a software program). For example, the instruction codes or the program routines may be executed by a computer-based electronic system, and may be stored in any storage device located inside or outside the computer-based electronic system.

Figure 9:
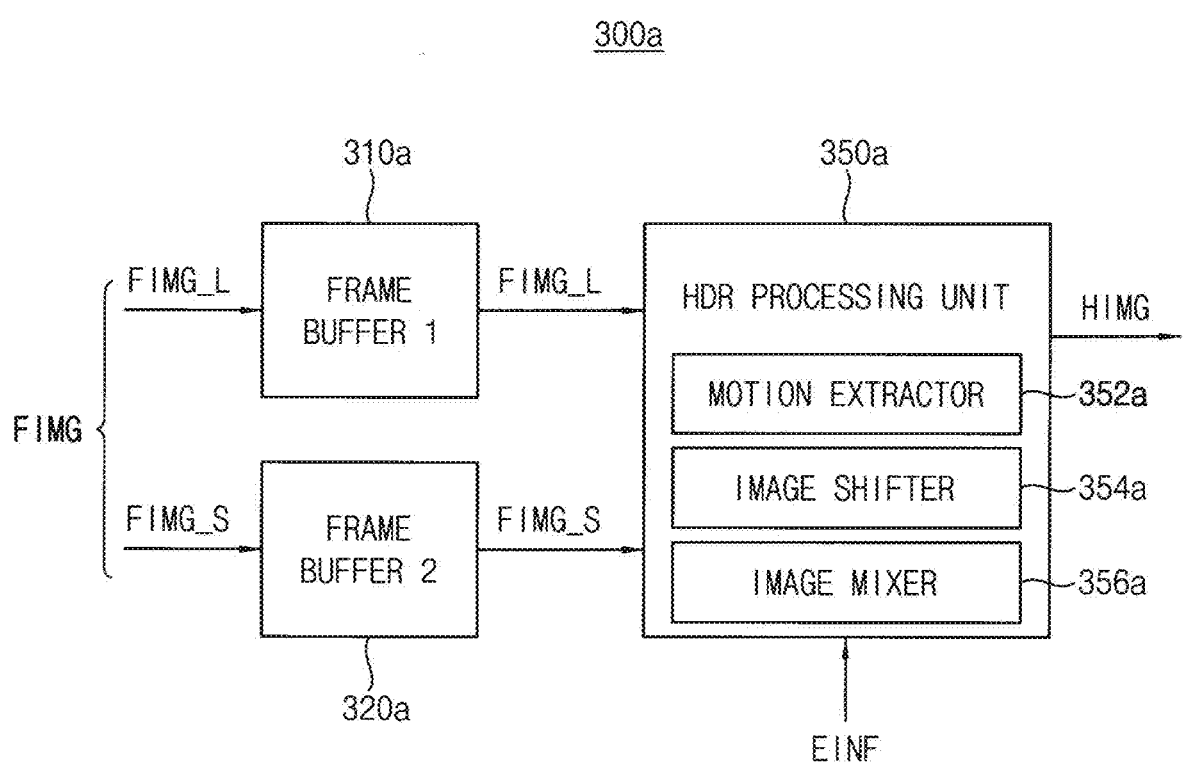
FIG. 9 is a block diagram illustrating an example of an HDR processor included in an image processing device according to example embodiments.

FIG. 9 is a block diagram illustrating an example of an HDR processor included in an image processing device according to example embodiments.

Referring to FIG. 9, an HDR processor 300a includes a first frame buffer 310a, a second frame buffer 320a and an HDR processing unit 350a.

The first frame buffer 310a and the second frame buffer 320a receive and store a plurality of frame images FIMG. In other words, each of the first frame buffer 310a and the second frame buffer 320a may operate as an input buffer.

The HDR processor 300a of FIG. 9 may be implemented with two frame buffers 310a and 320a such that the HDR processor 300a receives the plurality of frame images FIMG having two different exposure times L and S and stores frame images having the same exposure time in the same frame buffer. For example, the first frame buffer 310a may sequentially receive and store frame images FIMG_L having the first exposure time L among the plurality of frame images FIMG. The second frame buffer 320a may sequentially receive and store frame images FIMG_S having the second exposure time S among the plurality of frame images FIMG.

The HDR processing unit 350a receives exposure time information EINF, and generates a plurality of HDR images HIMG by combining the frame images FIMG_L and FIMG_S having different exposure times L and S based on the sliding window scheme. In other words, the HDR processing unit 350a may perform operation S200 in FIG. 1 and operations S210, S220 and S230 in FIG. 2.

An operation of the HDR processor 300a of FIG. 9 will be described in detail in connection with an example of FIG. 3. The frame images FIMG11, FIMG13 and FIMG15 in FIG. 3 may correspond to the frame images FIMG_L in FIG. 9, and the frame images FIMG12, FIMG14 and FIMG16 in FIG. 3 may correspond to the frame images FIMG_S in FIG. 9. The first frame buffer 310a may receive the frame image FIMG11, and the HDR processing unit 350a may output the frame image FIMG11 as the HDR image HIMG11 without performing any image processing. The second frame buffer 320a may receive the frame image FIMG12, and the HDR processing unit 350a may generate the HDR image HIMG12 by combining the frame images FIMG11 and FIMG12. The first frame buffer 310a may receive the frame image FIMG13, the previously stored frame image FIMG11 may be deleted or removed from the first frame buffer 310a, and the HDR processing unit 350a may generate the HDR image HIMG13 by combining the frame images FIMG12 and FIMG13. The second frame buffer 320a may receive the frame image FIMG14, the previously stored frame image FIMG12 may be deleted or removed from the second frame buffer 320a, and the HDR processing unit 350a may generate the HDR image HIMG14 by combining the frame images FIMG13 and FIMG14. Similarly, the frame images FIMG15 and FIMG16 may be sequentially received, and the HDR images HIMG15 and HIMG16 may be sequentially generated.

The HDR processing unit 350a may include a motion extractor 352a, an image shifter 354a and an image mixer 356a. For example, the processing circuitry included in the image processing device 100 may be hardwired or execute software that transforms the processing circuitry into a special purpose processor to perform the operations of the motion extractor 352a, the image shifter 354a and the image mixer 356a.

For example, in some example embodiments, at least a part of the motion extractor 352a, the image shifter 354a and the image mixer 356a in FIG. 9 may be implemented as hardware.

In other example embodiments, at least a part of the motion extractor 352a, the image shifter 354a and the image mixer 356a in FIG. 9 may be implemented as instruction codes or program routines (e.g., a software program).

The motion extractor 352a may extract at least one of the global movement and the local movement between the two consecutive frame images. The image shifter 354a may shift one of the two consecutive frame images based on the extracted movement. The image mixer 356a may combine the shifted frame image and the unshifted frame image to generate the HDR image. In other words, the motion extractor 352a may perform at least one of operation S211 in FIG. 4 and operation S212 in FIG. 6, the image shifter 354a may perform at least one of operation S213 in FIG. 4 and operation S214 in FIG. 6, and the image mixer 356a may perform at least one of operation S215 in FIG. 4 and operation S216 in FIG. 6.

Figure 10:
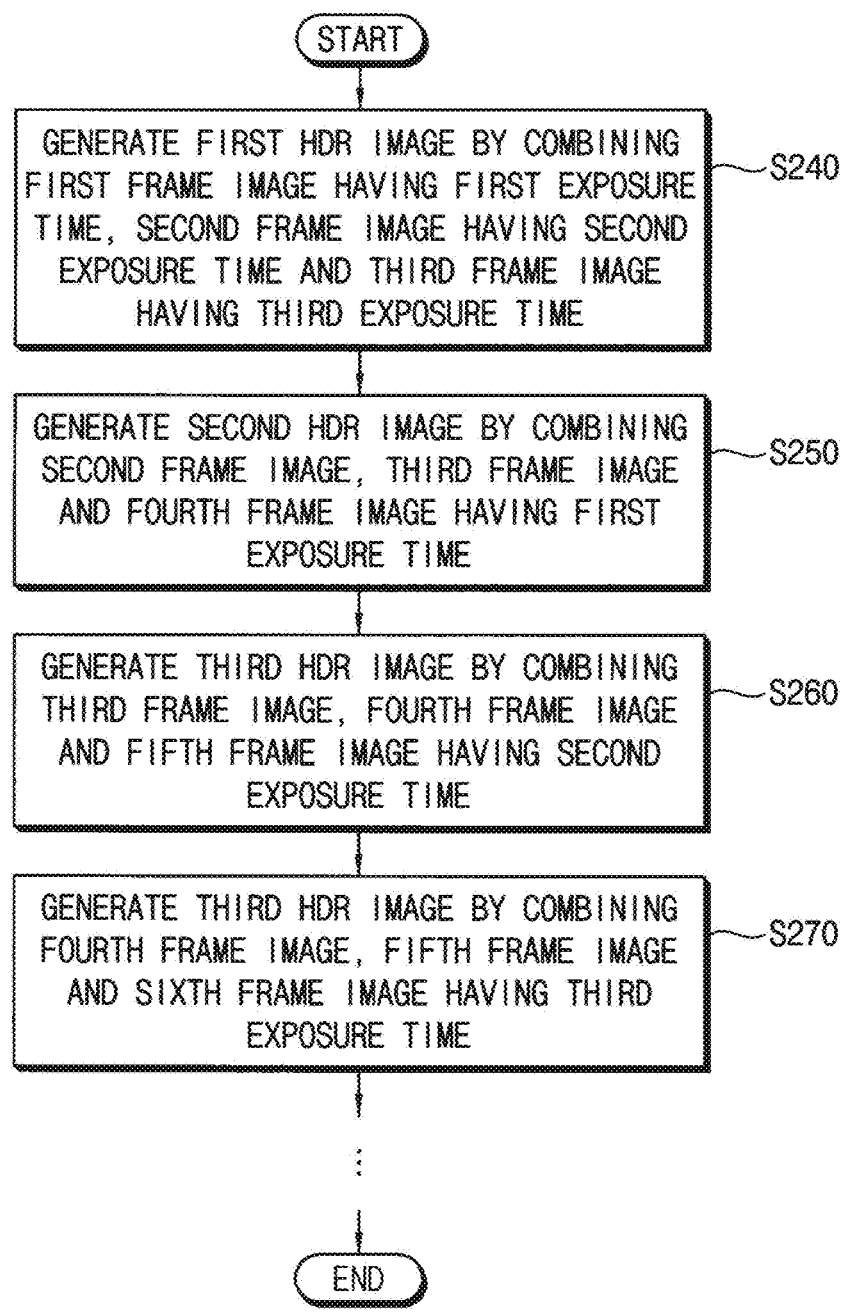
FIG. 10 is a flowchart illustrating another example of generating HDR images in FIG. 1.

FIG. 10 is a flowchart illustrating another example of generating HDR images in FIG. 1. FIG. 11 is a diagram for describing an operation of generating HDR images in FIG. 10. The descriptions repeated with FIGS. 2 and 3 will be omitted.

Figure 11:
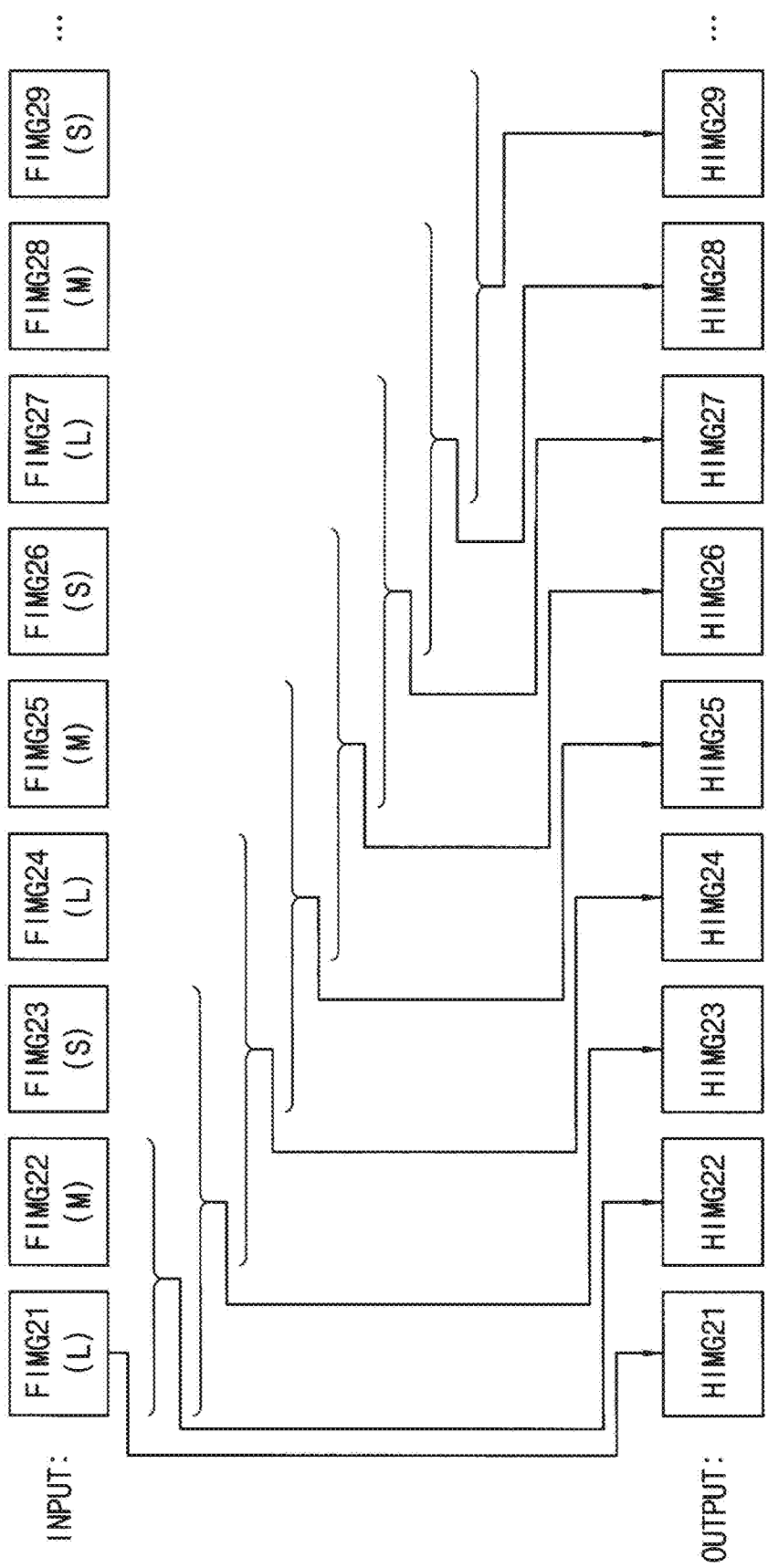
FIG. 11 is a diagram for describing an operation of generating HDR images in FIG. 10.

FIGS. 10 and 11 illustrate an example where the size of the window and the number of the different exposure times are three, e.g., N=3. In FIG. 11, a plurality of frame images FIMG21, FIMG22, FIMG23, FIMG24, FIMG25, FIMG26, FIMG27, FIMG28, FIMG29, may be provided from an image sensor, a memory device, or the like. The frame images FIMG21, FIMG24 and FIMG27 having a first exposure time L, the frame images FIMG22, FIMG25 and FIMG28 having a second exposure time M and the frame images FIMG23, FIMG26, FIMG29 having a third exposure time S may be alternately repeated.

Referring to FIGS. 1, 10 and 11, as described with reference to operation S100, a start frame image or first frame image FIMG21 that is arranged at the head of the plurality of frame images FIMG21 through FIMG29 may be output as a start HDR image HIMG21 among a plurality of HDR images HIMG21, HIMG22, HIMG23, HIMG24, HIMG25, HIMG26, HIMG27, HIMG28, HIMG29, . . . without performing any image processing.

In addition, a second start HDR image HIMG22 may be generated by combining the start frame image FIMG21 and a second start frame image or second frame image FIMG22 that is arranged immediately after the start frame image FIMG21. If the number of input frame images is smaller than the size of the window at an initial operation time, all of the input frame images may be combined to generate an HDR image. The image combining operation for the first and second frame images FIMG21 and FIMG22 may be performed in the same manner as described with reference to FIGS. 4 through 7.

After then, as described with reference to operation S200, when generating the remainder HDR images HIMG23, HIMG24, HIMG25, HIMG26, HIMG27, HIMG28 and HIMG29 other than the start HDR images HIMG21 and HIMG22 among the plurality of HDR images HIMG21, HIMG22, HIMG23, HIMG24, HIMG25, HIMG26, HIMG27, HIMG28 and HIMG29, three consecutive frame images having different exposure times L, M and S may be sequentially combined by the sliding window scheme using a window having a size of 3.

For example, in operation S240, a first HDR image HIMG23 may be generated by combining the first frame image FIMG21 having the first exposure time L, the second frame image FIMG22 having the second exposure time M and a third frame image FIMG23 having the third exposure time S.

The second frame image FIMG22 may be a frame image subsequent to the first frame image FIMG21, and the third frame image FIMG23 may be a frame image subsequent to the second frame image FIMG22. For example, the first frame image FIMG21, the second frame image FIMG22 and the third frame image FIMG23 may be three consecutive frame images. The first exposure time L, the second exposure time M and the third exposure time S may be different from each other. For example, the second exposure time M may be shorter than the first exposure time L, and may be longer than the third exposure time S.

The image combining operation for the three consecutive frame images may be performed in the similar manner as described with reference to FIGS. 4 through 7. For example, the last frame image (e.g., the third frame image FIMG23) among the three consecutive frame images may be used as a reference image, the remaining two frame images (e.g., the first and second frame images FIMG21 and FIMG22) may be shifted with respect to the last frame image, and then the image combining operation may be performed. For another example, the middle frame image (e.g., the second frame image FIMG22) among the three consecutive frame images may be used as a reference image, the remaining two frame images (e.g., the first and third frame images FIMG21 and FIMG23) may be shifted with respect to the middle frame image, and then the image combining operation may be performed. Alternatively, the front frame image (e.g., the first frame image FIMG21) among the three consecutive frame images may be used as a reference image, the remaining two frame images (e.g., the second and third frame images FIMG23 and FIMG23) may be shifted with respect to the front frame image, and then the image combining operation may be performed.

In operation S250, a second HDR image HIMG24 may be generated by combining the second frame image FIMG22, the third frame image FIMG23 and a fourth frame image FIMG24 having the first exposure time L. The second HDR image HIMG24 may be an HDR image subsequent to the first HDR image HIMG23, and the fourth frame image FIMG24 may be a frame image subsequent to the third frame image FIMG23. In other words, the window may be slid or shifted by one frame after operation S240 is completed, and then operation S250 may be performed using the slid window.

Similarly, in operation S260, a third HDR image HIMG25 subsequent to the second HDR image HIMG24 may be generated by combining the third frame image FIMG23, the fourth frame image FIMG24 and a fifth frame image FIMG25 subsequent to the fourth frame image FIMG24 and having the second exposure time M.

In operation S270, a fourth HDR image HIMG26 subsequent to the third HDR image HIMG25 may be generated by combining the fourth frame image FIMG24, the fifth frame image FIMG25 and a sixth frame image FIMG26 subsequent to the fifth frame image FIMG25 and having the third exposure time S.

In addition, as illustrated in FIG. 11, a fifth HDR image HIMG27 subsequent to the fourth HDR image HIMG26 may be generated by combining the fifth frame image FIMG25, the sixth frame image FIMG26 and a seventh frame image FIMG27 subsequent to the sixth frame image FIMG26 and having the first exposure time L. A sixth HDR image HIMG28 subsequent to the fifth HDR image HIMG27 may be generated by combining the sixth frame image FIMG26, the seventh frame image FIMG27 and an eighth frame image FIMG28 subsequent to the seventh frame image FIMG27 and having the second exposure time M. A seventh HDR image HIMG29 subsequent to the sixth HDR image HIMG28 may be generated by combining the seventh frame image FIMG27, the eighth frame image FIMG28 and a ninth frame image FIMG29 subsequent to the eighth frame image FIMG28 and having the third exposure time S.

Figure 12:
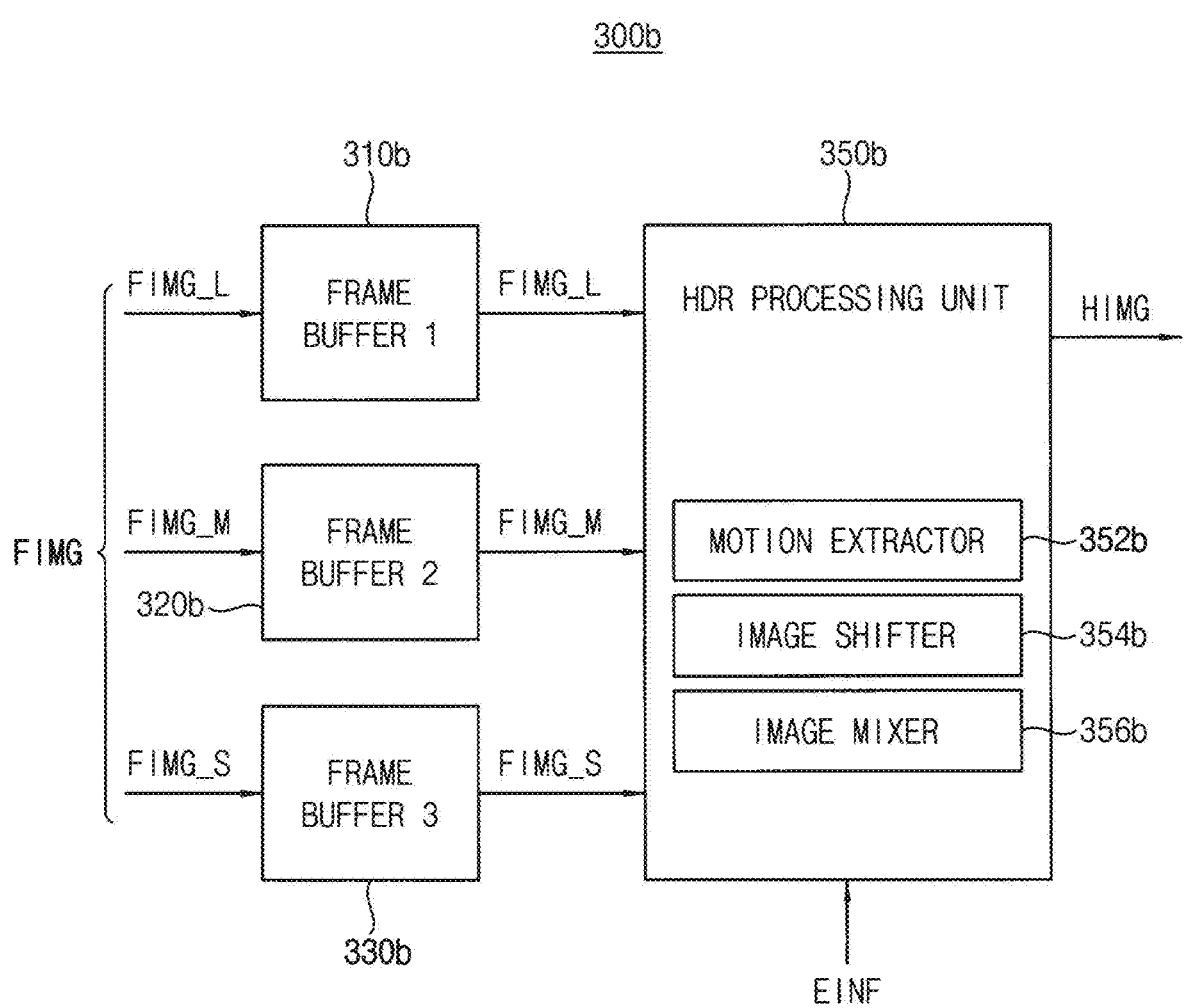
FIG. 12 is a block diagram illustrating another example of an HDR processor included in an image processing device according to example embodiments.

FIG. 12 is a block diagram illustrating another example of an HDR processor included in an image processing device according to example embodiments. The descriptions repeated with FIG. 9 will be omitted.

Referring to FIG. 12, an HDR processor 300b includes a first frame buffer 310b, a second frame buffer 320b, a third frame buffer 330b and an HDR processing unit 350b.

The first frame buffer 310b, the second frame buffer 320b and the third frame buffer 330b receive and store a plurality of frame images FIMG. Each of the first frame buffer 310b, the second frame buffer 320b and the third frame buffer 330b may operate as an input buffer.

The HDR processor 300b of FIG. 12 may be implemented with three frame buffers 310b, 320b and 330b such that the HDR processor 300b receives the plurality of frame images FIMG having three different exposure times L, M and S and stores frame images having the same exposure time in the same frame buffer. For example, the first frame buffer 310b may sequentially receive and store frame images FIMG_L having the first exposure time L among the plurality of frame images FIMG. The second frame buffer 320b may sequentially receive and store frame images FIMG_M having the second exposure time M among the plurality of frame images FIMG. The third frame buffer 330b may sequentially receive and store frame images FIMG_S having the third exposure time S among the plurality of frame images FIMG.

The HDR processing unit 350b receives exposure time information EINF, and generates a plurality of HDR images HIMG by combining the frame images FIMG_L, FIMG_M and FIMG_S having different exposure times L, M and S based on the sliding window scheme. In other words, the HDR processing unit 350b may perform operation S200 in FIG. 1 and operations S240, S250, S260 and S270 in FIG. 10.

An operation of the HDR processor 300b of FIG. 12 will be described in detail in connection with an example of FIG. 11. The frame images FIMG21, FIMG24 and FIMG27 in FIG. 11 may correspond to the frame images FIMG_L in FIG. 12, the frame images FIMG22, FIMG25 and FIMG28 in FIG. 11 may correspond to the frame images FIMG_M in FIG. 12, and the frame images FIMG23, FIMG26 and FIMG29 in FIG. 11 may correspond to the frame images FIMG_S in FIG. 12. The first frame buffer 310b may receive the frame image FIMG21, and the HDR processing unit 350b may output the frame image FIMG21 as the HDR image HIMG21 without performing any image processing. The second frame buffer 320b may receive the frame image FIMG22, and the HDR processing unit 350b may generate the HDR image HIMG22 by combining the frame images FIMG21 and FIMG22. The third frame buffer 330b may receive the frame image FIMG23, and the HDR processing unit 350b may generate the HDR image HIMG23 by combining the frame images FIMG21, FIMG22 and FIMG23. The first frame buffer 310b may receive the frame image FIMG24, the previously stored frame image FIMG21 may be deleted or removed from the first frame buffer 310b, and the HDR processing unit 350b may generate the HDR image HIMG24 by combining the frame images FIMG22, FIMG23 and FIMG24. Similarly, the frame images FIMG25, FIMG26, FIMG27, FIMG28 and FIMG29 may be sequentially received, and the HDR images HIMG25, HIMG26, HIMG27, HIMG28 and HIMG29 may be sequentially generated.

The HDR processing unit 350b may include a motion extractor 352b, an image shifter 354b and an image mixer 356b. The motion extractor 352b, the image shifter 354b and the image mixer 356b in FIG. 12 may be substantially the same as the motion extractor 352a, the image shifter 354a and the image mixer 356a in FIG. 9, respectively.

In some example embodiments, as described with reference to FIGS. 9 and 12, the number of frame buffers that are included in the image processing device operating based on the sliding window scheme (e.g., that are included in the HDR processor according to example embodiments) may be substantially equal to the number of exposure times that are included in the plurality of frame images FIMG, and may increase as the number of exposure times increases. For example, when the plurality of frame images FIMG have two different exposure times L and S, the HDR processor 300a may include two frame buffers 310a and 320a, as illustrated in FIG. 9. When the plurality of frame images FIMG have three different exposure times L, M and S, the HDR processor 300b may include three frame buffers 310b, 320b and 330b, as illustrated in FIG. 12.

In the method of processing the image and the image processing device described with reference to FIGS. 1 through 12, the HDR images may be generated for all frame images based on the sliding window scheme without being influenced by the number of used frames, and thus the HDR video image or the HDR images included in the HDR video image may be efficiently generated without loss of the frame rate. If there is no restriction on frame delay or computing power, e.g., a recording operation, there may be an advantage that input frames may be used for generating an improved or enhanced HDR video image without limitation.

Figure 13:
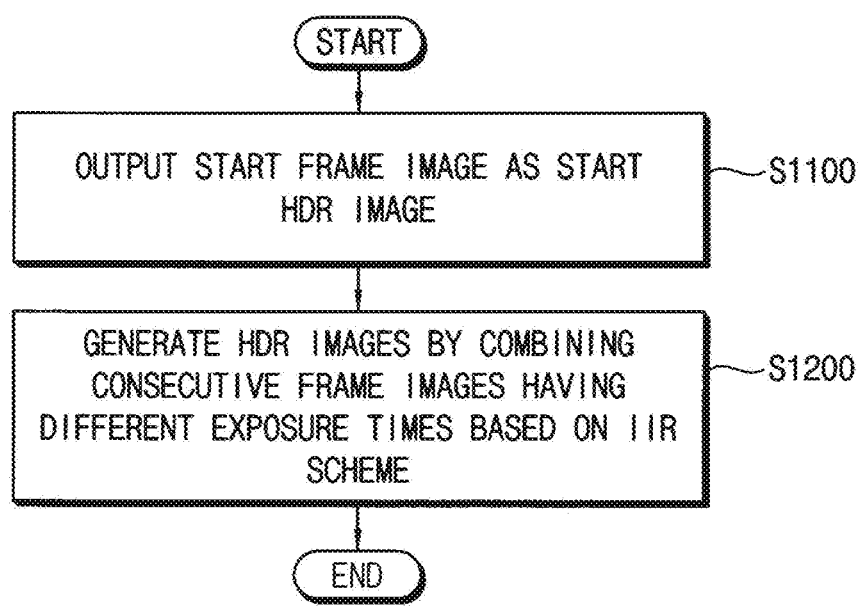
FIG. 13 is a flowchart illustrating a method of processing an image according to example embodiments.

FIG. 13 is a flowchart illustrating a method of processing an image according to example embodiments. The descriptions repeated with FIG. 1 will be omitted.

Referring to FIG. 13, a method of processing an image according to example embodiments is performed or executed on a video image including a plurality of frame images. In other words, the image to be processed is the video image including the plurality of frame images. Particularly, the method of processing the image according to example embodiments is applied or employed to obtain or acquire an HDR video image by generating a plurality of HDR images based on the plurality of frame images without loss of a frame rate.

In the method of processing the image according to example embodiments, in operation S1100, a start frame image is output as a start HDR image without performing any image processing, compositing or synthesis. The start frame image is included in the plurality of frame images and arranged at the head of the plurality of frame images. The start HDR image is included in the plurality of HDR images and arranged at the head of the plurality of HDR images. Operation S1100 in FIG. 13 may be substantially the same as operation S100 in FIG. 1.

In operation S1200, each of HDR images is generated by combining, mixing, compositing or synthesizing consecutive frame images among the plurality of frame images based on a recursive infinite impulse response (IIR) scheme. The consecutive frame images to be combined have different exposure times.

The IIR scheme is a property applying to many linear time-invariant systems. Common examples of the linear time-invariant systems are most electronic and digital filters. Systems with this property are known as IIR systems or IIR filters, and are distinguished by having an impulse response which does not become exactly zero past a certain point, but continues indefinitely. This is in contrast to a finite impulse response (FIR) in which the impulse response does become exactly zero after a finite duration. In the IIR scheme, a current output from a current input is generated using a result of a previous output. Similarly, the IIR scheme may be applied or employed to generate the HDR images in the method of processing the image according to example embodiments. For example, a current or present HDR image may be generated using an HDR image that is previously generated and output and a frame image that is currently input. An image processing operation based on the IIR scheme and a configuration of an image processing device for performing the image processing operation will be described with reference to FIGS. 14 through 18.

Figure 14:
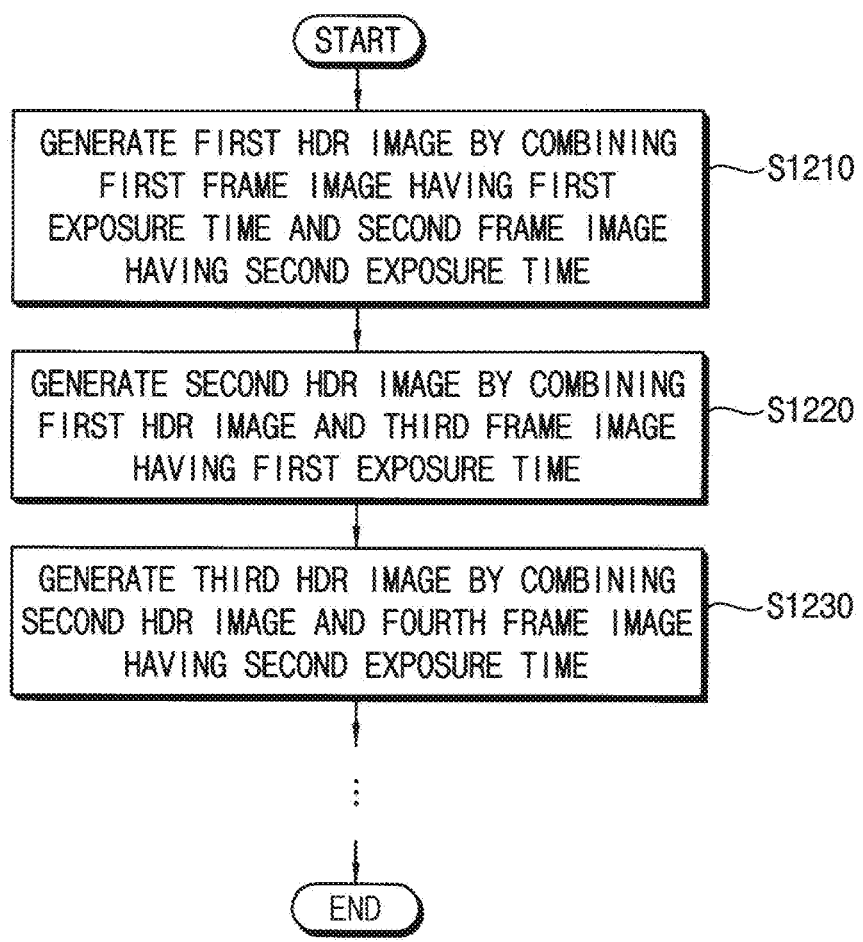
FIG. 14 is a flowchart illustrating an example of generating HDR images in FIG. 13.
Figure 15:
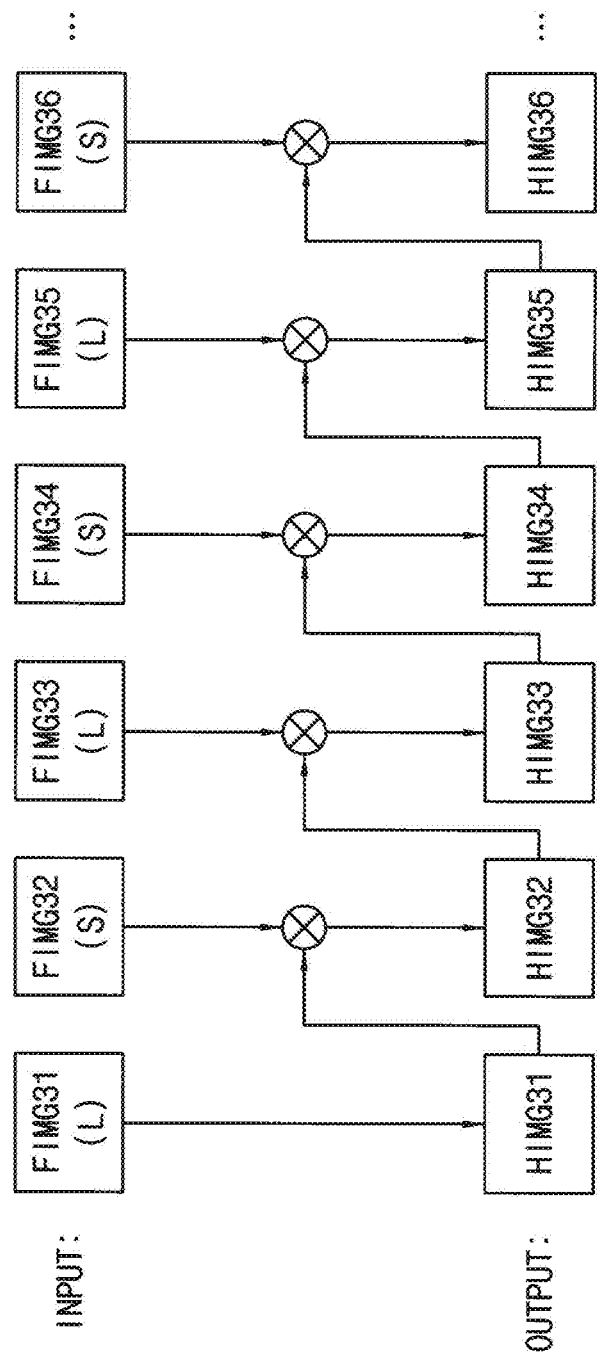
FIG. 15 is a diagram for describing an operation of generating HDR images in FIG. 14.

FIG. 14 is a flowchart illustrating an example of generating HDR images in FIG. 13. FIG. 15 is a diagram for describing an operation of generating HDR images in FIG. 14.

FIGS. 14 and 15 illustrate an example where the number of the different exposure times is two. In FIG. 15, a plurality of frame images FIMG31, FIMG32, FIMG33, FIMG34, FIMG35, FIMG36, . . . that are included in a video image (e.g., an input image) may be provided from an image sensor, a memory device, or the like. The frame images FIMG31, FIMG33 and FIMG35 having a first exposure time L and the frame images FIMG32, FIMG34 and FIMG36 having a second exposure time S may be alternately repeated.

Referring to FIGS. 13, 14 and 15, as described with reference to operation S1100, a start frame image or first frame image FIMG31 that is arranged at the head of the plurality of frame images FIMG31, FIMG32, FIMG33, FIMG34, FIMG35 and FIMG36 may be output as a start HDR image HIMG31 among a plurality of HDR images HIMG31, HIMG32, HIMG33, HIMG34, HIMG35, HIMG36, . . . that are included in an HDR video image (e.g., an output image) without performing any image processing.

After then, as described with reference to operation S1200, when generating the remainder HDR images HIMG32, HIMG33, HIMG34, HIMG35 and HIMG36 other than the start HDR image HIMG31 among the plurality of HDR images HIMG31, HIMG32, HIMG33, HIMG34, HIMG35 and HIMG36, an HDR image that is a current output may be generated by the IIR scheme by combining an HDR image that is previously generated and output and a frame image that is currently input.

In operation S1210, a first HDR image HIMG32 may be generated by combining the start HDR image HIMG31 and a second frame image FIMG32. Since the start HDR image HIMG31 and the start frame image FIMG31 are substantially the same as each other, the above-described operation may be explained to generate the first HDR image HIMG32 by combining the first frame image FIMG31 having the first exposure time L and the second frame image FIMG32 having the second exposure time S. The image combining operation for the first and second frame images FIMG31 and FIMG32 may be performed in the same manner as described with reference to FIGS. 4 through 7.

In operation S1220, a second HDR image HIMG33 may be generated by combining the first HDR image HIMG32 and a third frame image FIMG33 having the first exposure time L. The second HDR image HIMG33 may be an HDR image subsequent to the first HDR image HIMG32, and the third frame image FIMG33 may be a frame image subsequent to the second frame image FIMG32.

The image combining operation for the first HDR image HIMG32 and the third frame image FIMG33 may be performed in the similar manner as described with reference to FIGS. 4 through 7. For example, as with the first scheme described with reference to FIG. 4, a global movement between the first HDR image HIMG32 and the third frame image FIMG33 may be extracted, the first HDR image HIMG32 may be shifted based on the global movement, and the shifted first HDR image HIMG32 and the third frame image FIMG33 may be combined with each other. For another example, as with the second scheme described with reference to FIG. 6, a local movement for a first object between the first HDR image HIMG32 and the third frame image FIMG33 may be extracted, the first object in the first HDR image HIMG32 may be shifted based on the local movement, and the shifted first HDR image HIMG32 including the shifted first object and the third frame image FIMG33 may be combined with each other. In some example embodiments, the first HDR image HIMG32 other than the third frame image FIMG33 may be used as a reference image.

Similarly, in operation S1230, a third HDR image HIMG34 subsequent to the second HDR image HIMG33 may be generated by combining the second HDR image HIMG33 and a fourth frame image FIMG34 subsequent to the third frame image FIMG33 and having the second exposure time S. In addition, as illustrated in FIG. 15, a fourth HDR image HIMG35 subsequent to the third HDR image HIMG34 may be generated by combining the third HDR image HIMG34 and a fifth frame image FIMG35 subsequent to the fourth frame image FIMG34 and having the first exposure time L. A fifth HDR image HIMG36 subsequent to the fourth HDR image HIMG35 may be generated by combining the fourth HDR image HIMG35 and a sixth frame image FIMG36 subsequent to the fifth frame image FIMG35 and having the second exposure time S.

As described above, when the HDR images are generated by combining the frame images based on the IIR scheme, the number of the plurality of frame images FIMG31, FIMG32, FIMG33, FIMG34, FIMG35 and FIMG36 that are included in the input image and received before the image processing operation may be substantially equal to the number of the plurality of HDR images HIMG31, HIMG32, HIMG33, HIMG34, HIMG35 and HIMG36 that are included in the output image and obtained after the image processing operation. Thus, the HDR video image or the HDR images included in the HDR video image may be efficiently generated without loss of the frame rate.

Figure 16:
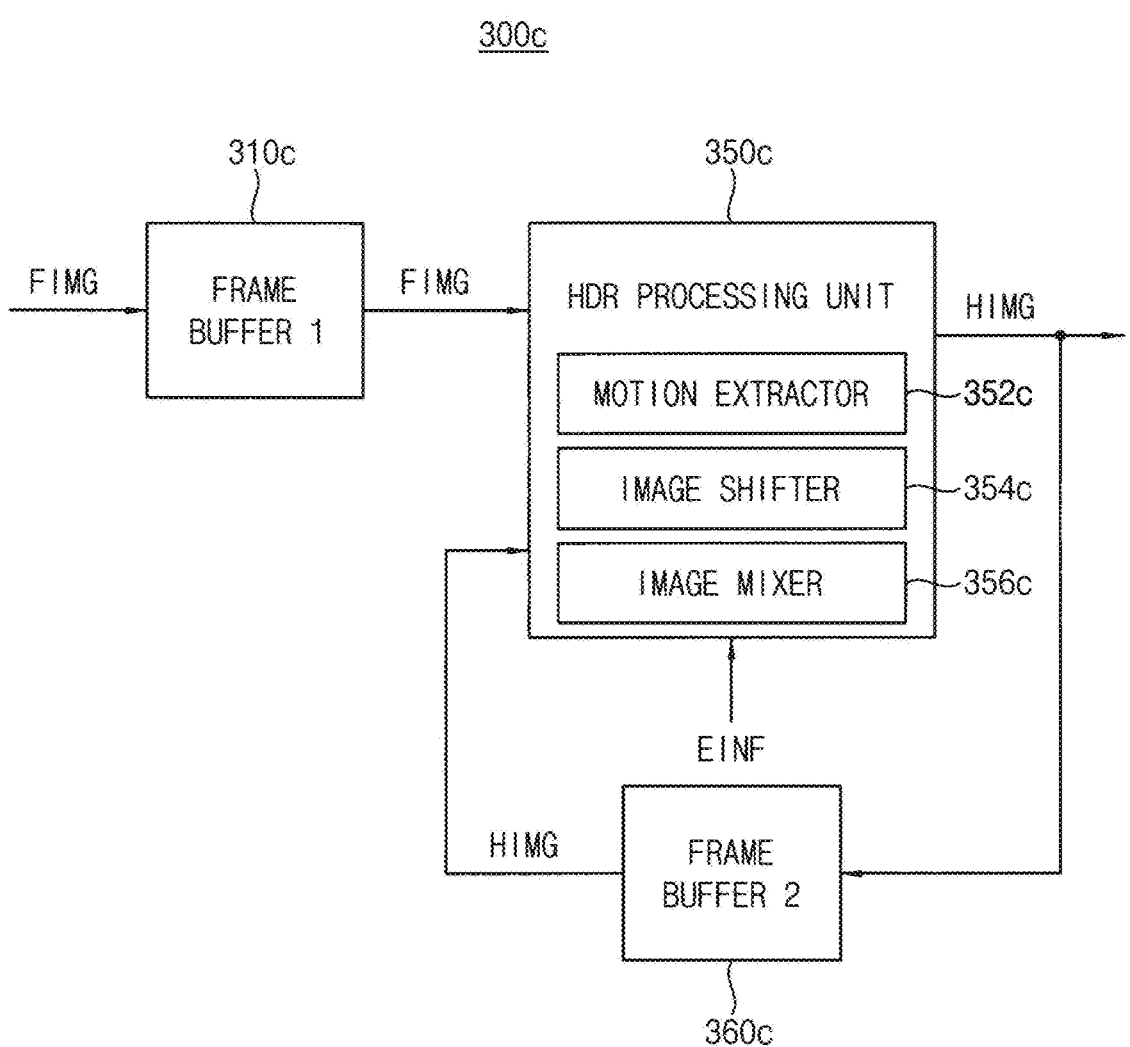
FIG. 16 is a block diagram illustrating still another example of an HDR processor included in an image processing device according to example embodiments.

FIG. 16 is a block diagram illustrating still another example of an HDR processor included in an image processing device according to example embodiments. The descriptions repeated with FIGS. 9 and 12 will be omitted.

Referring to FIG. 16, an HDR processor 300c includes a first frame buffer 310c, an HDR processing unit 350c and a second frame buffer 360c.

The first frame buffer 310c receives and stores a plurality of frame images FIMG. The first frame buffer 310c may operate as an input buffer. In the HDR processor 300c operating based on the IIR scheme, the number of frame buffers (e.g., the first frame buffer 310c) operating as input buffers may be fixed to one regardless of the number of exposure times included in the plurality of frame images FIMG.

The HDR processing unit 350c receives exposure time information EINF, and generates a plurality of HDR images HIMG by combining the plurality of frame images FIMG having different exposure times based on the IIR scheme. For example, the HDR processing unit 350c may perform operation S1200 in FIG. 13 and operations S1210, S1220 and S1230 in FIG. 14. For another example, the HDR processing unit 350c may perform operation S1200 in FIG. 13 and operation S1240, S1250, S1260, S1270 and S1280 in FIG. 17.

In some example embodiments, the HDR processing unit 350c may be implemented with an IIR filter. When combining the plurality of frame images FIMG based on the IIR scheme, filter coefficients of the IIR filter may be changed based on the exposure times of the plurality of frame images FIMG, e.g., based on the exposure time information EINF.

The second frame buffer 360c receives and stores the plurality of HDR images HIMG. The second frame buffer 360c may operate as an accumulation buffer for sequentially storing the plurality of HDR images HIMG. In the HDR processor 300c operating based on the IIR scheme, the number of frame buffers (e.g., the second frame buffer 360c) operating as accumulation buffers may be fixed to one regardless of the number of exposure times included in the plurality of frame images FIMG.

As described above, since the number of input buffers and the number of accumulation buffers are always fixed in the HDR processor 300c operating based on the IIR scheme, the number of the total frame buffers included in the HDR processor 300c may also be fixed to two regardless of the number of exposure times included in the plurality of frame images FIMG.

An operation of the HDR processor 300c of FIG. 16 will be described in detail in connection with an example of FIG. 15.

The first frame buffer 310c may receive the frame image FIMG31, the HDR processing unit 350c may output the frame image FIMG31 as the HDR image HIMG31 without performing any image processing, and the second frame buffer 360c may receive the HDR image HIMG31. The first frame buffer 310c may receive the frame image FIMG32, the previously stored frame image FIMG31 may be deleted or removed from the first frame buffer 310c, the HDR processing unit 350c may generate the HDR image HIMG32 by combining the HDR image HIMG31 (e.g., the frame image FIMG31) and the frame image FIMG32, the second frame buffer 360c may receive the HDR image HIMG32, and the previously stored HDR image HIMG31 may be deleted or removed from the second frame buffer 360c. Similarly, the frame images FIMG33, FIMG34, FIMG35 and FIMG36 may be sequentially received, and the HDR images HIMG33, HIMG34, HIMG35 and HIMG36 may be sequentially generated.

The HDR processing unit 350c may include a motion extractor 352c, an image shifter 354c and an image mixer 356c. The motion extractor 352c, the image shifter 354c and the image mixer 356c in FIG. 16 may be substantially the same as the motion extractor 352a, the image shifter 354a and the image mixer 356a in FIG. 9, respectively.

Figure 17:
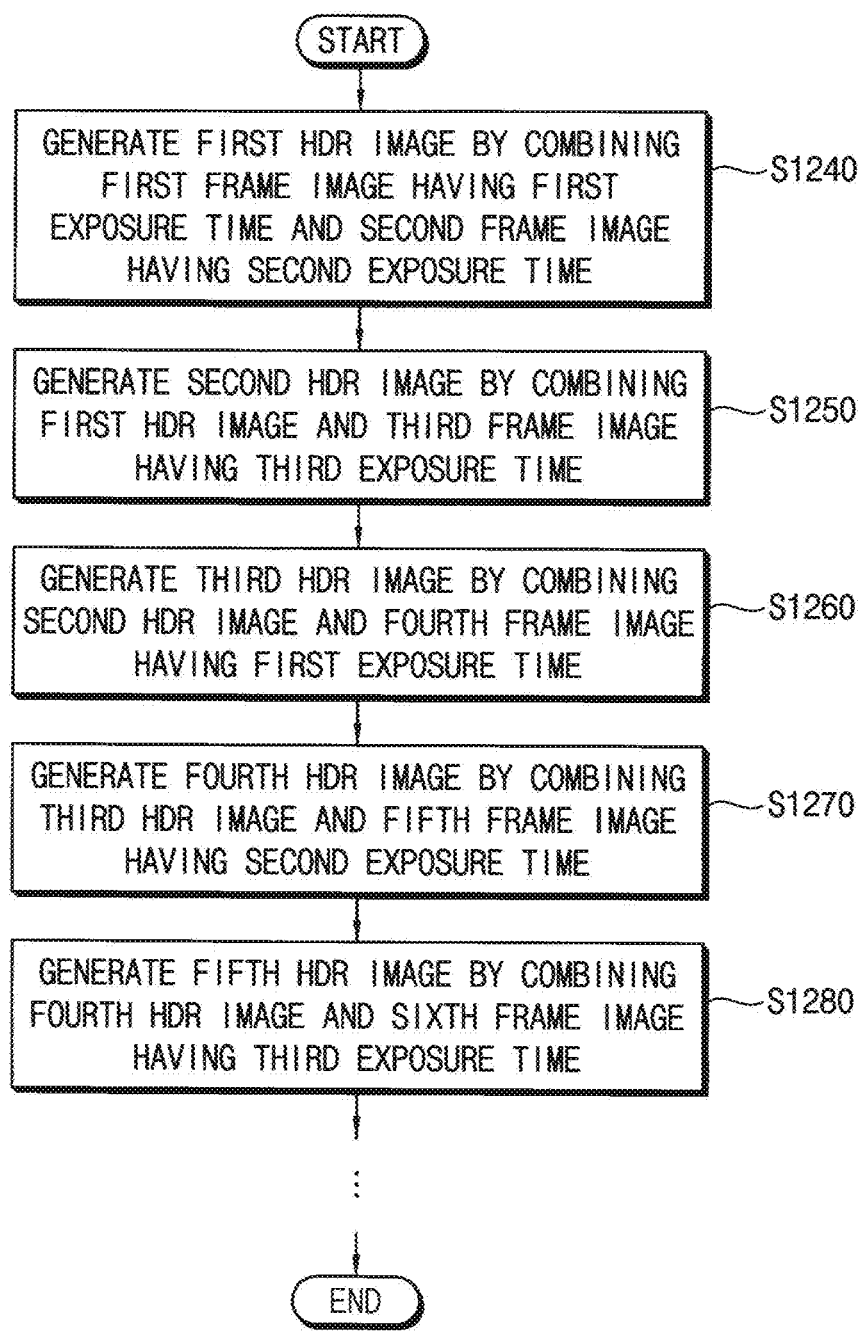
FIG. 17 is a flowchart illustrating another example of generating HDR images in FIG. 13.
Figure 18:
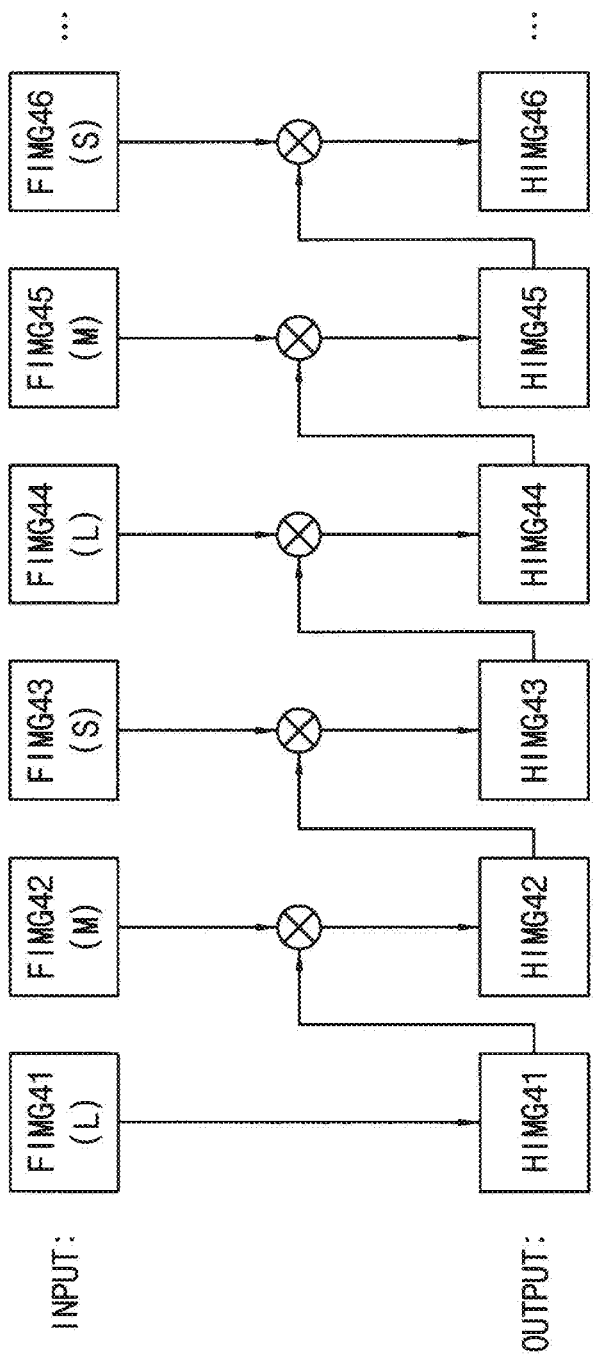
FIG. 18 is a diagram for describing an operation of generating HDR images in FIG. 17.

FIG. 17 is a flowchart illustrating another example of generating HDR images in FIG. 13. FIG. 18 is a diagram for describing an operation of generating HDR images in FIG. 17. The descriptions repeated with FIGS. 14 and 15 will be omitted.

FIGS. 17 and 18 illustrate an example where the number of the different exposure times is three. In FIG. 18, a plurality of frame images FIMG41, FIMG42, FIMG43, FIMG44, FIMG45, FIMG46, . . . may be provided from an image sensor, a memory device, or the like. The frame images FIMG41 and FIMG44 having a first exposure time L, the frame images FIMG42 and FIMG45 having a second exposure time M and the frame images FIMG43 and FIMG46 having a third exposure time S may be alternately repeated.

Referring to FIGS. 13, 17 and 18, as described with reference to operation S1100, a start frame image or first frame image FIMG41 that is arranged at the head of the plurality of frame images FIMG41 through FIMG46 may be output as a start HDR image HIMG41 among a plurality of HDR images HIMG41, HIMG42, HIMG43, HIMG44, HIMG45, HIMG46, without performing any image processing.

After then, as described with reference to operation S1200, when generating the remainder HDR images HIMG42, HIMG43, HIMG44, HIMG45 and HIMG46 other than the start HDR image HIMG41 among the plurality of HDR images HIMG41, HIMG42, HIMG43, HIMG44, HIMG45 and HIMG46, an HDR image that is a current output may be generated by the IIR scheme by combining an HDR image that is previously generated and output and a frame image that is currently input.

For example, in operation S1240, a first HDR image HIMG42 may be generated by combining the first frame image FIMG41 having the first exposure time L and the second frame image FIMG42 having the second exposure time M. Operation S1240 in FIG. 17 may be substantially the same as Operation S1210 in FIG. 14.

In operation S1250, a second HDR image HIMG43 subsequent to the first HDR image HIMG42 may be generated by combining the first HDR image HIMG42 and a third frame image FIMG43 subsequent to the second frame image FIMG42 and having the third exposure time S.

Similarly, in operation S1260, a third HDR image HIMG44 subsequent to the second HDR image HIMG43 may be generated by combining the second HDR image HIMG43 and a fourth frame image FIMG44 subsequent to the third frame image FIMG43 and having the first exposure time L.

In operation S1270, a fourth HDR image HIMG45 subsequent to the third HDR image HIMG44 may be generated by combining the third HDR image HIMG44 and a fifth frame image FIMG45 subsequent to the fourth frame image FIMG44 and having the second exposure time M.

In operation S1280, a fifth HDR image HIMG46 subsequent to the fourth HDR image HIMG45 may be generated by combining the fourth HDR image HIMG45 and a sixth frame image FIMG46 subsequent to the fifth frame image FIMG45 and having the third exposure time S.

As described above, when the HDR images are generated by combining the frame images based on the IIR scheme, the number of frame buffers that are required for the image processing operation may be fixed to be a constant regardless of the number of exposure times that are included in the plurality of frame images. Thus, the method described with reference to FIGS. 17 and 18 may also be performed by the HDR processor 300c of FIG. 16.

In the method of processing the image and the image processing device described with reference to FIGS. 13 through 18, the HDR images may be generated for all frame images based on the IIR scheme, and thus the HDR video image or the HDR images included in the HDR video image may be efficiently generated without loss of the frame rate. In the IIR scheme, the video HDR may be implemented using only the current input frame and the HDR frame output immediately before, and the IIR filter coefficients may be changed based on the exposure time of the input frame. Compared with the sliding window scheme, only two frame buffers may be used in the IIR scheme, and thus there may be an additional advantage of implementing the video HDR faster without frame delay.

Although example embodiments are described with reference to FIGS. 1 through 18 based on examples where the plurality of frame images, which are input images, have a specific number of exposure times and a specific pattern of exposure times, example embodiments are not limited thereto. For example, the plurality of frame images may have four or more exposure times, and a pattern of exposure times included in the plurality of frame images may be changed.

Figure 19:
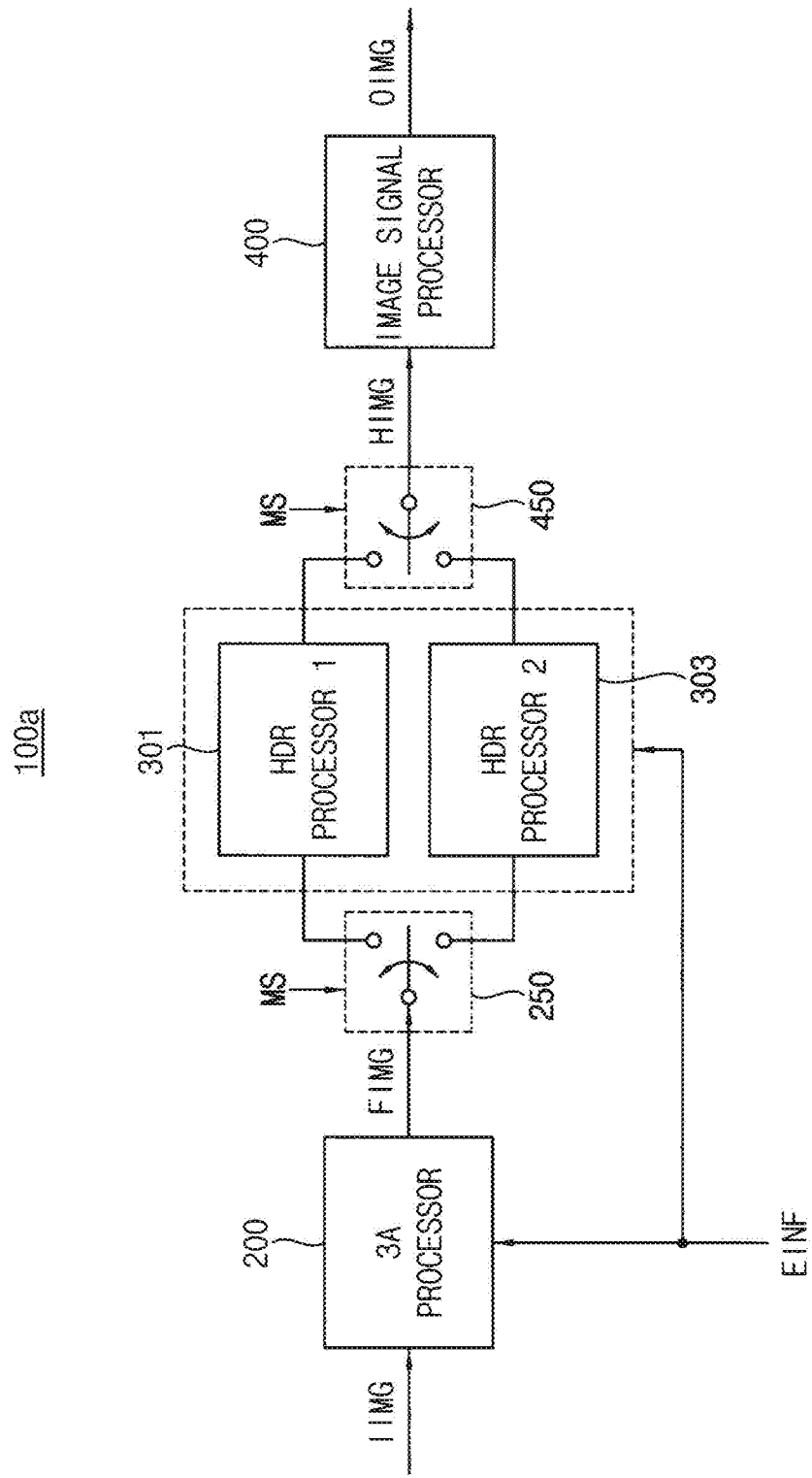
FIG. 19 is a block diagram illustrating an image processing device according to example embodiments.

FIG. 19 is a block diagram illustrating an image processing device according to example embodiments. The descriptions repeated with FIG. 8 will be omitted.

Referring to FIG. 19, an image processing device 100a includes a first HDR processor 301 and a second HDR processor 303. The image processing device 100a may further include a 3A processor 200, an image signal processor 400, a first switch 250 and a second switch 450.

The image processing device 100a of FIG. 19 may be substantially the same as the image processing device 100 of FIG. 8, except that the image processing device 100a includes two HDR processors 301 and 303 and further includes two switches 250 and 450.

The first HDR processor 301 may operate based on the sliding window scheme described with reference to FIGS. 1 through 7, 10 and 11. For example, the first HDR processor 301 may be the HDR processor 300a of FIG. 9 or the HDR processor 300b of FIG. 12. The second HDR processor 303 may operate based on the IIR scheme described with reference to FIGS. 13 through 15, 17 and 18. For example, the second HDR processor 303 may be the HDR processor 300c of FIG. 16.

The first switch 250 and the second switch 450 may select one of the first HDR processor 301 and the second HDR processor 303 based on a mode signal MS. For example, when the mode signal MS has a first logic level (e.g., a logic low level), the first and second switches 250 and 450 may be connected to the first HDR processor 301, and the image processing device 100a may generate the plurality of HDR images HIMG based on the sliding window scheme. When the mode signal MS has a second logic level (e.g., a logic high level), the first and second switches 250 and 450 may be connected to the second HDR processor 303, and the image processing device 100a may generate the plurality of HDR images HIMG based on the IIR scheme.

As will be appreciated by those skilled in the art, example embodiments of the inventive concepts may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 20 is a block diagram illustrating an electronic system according to example embodiments.

Referring to FIG. 20, an electronic system 1000 includes a processor 1010, a connectivity 1020, a memory device 1030, a user interface 1040, an image pickup device 1050 and an image processing device 1060. Although not illustrated in FIG. 20, the electronic system 1000 may further include a power supply.

The processor 1010 may perform various computational functions such as particular calculations and tasks. The connectivity 1020 may communicate with an external device. The memory device 1030 may operate as a data storage for data processed by the processor 1010 or a working memory. The user interface 1040 may include at least one input device such as a keypad, a button, a microphone, a touch screen, etc., and/or at least one output device such as a speaker, or a display device, etc. The power supply may provide power to the electronic system 1000.

The image pickup device 1050 and the image processing device 1060 are controlled by the processor 1010. The image pickup device 1050 generates a plurality of frame images having different exposure times. For example, the image pickup device 1050 may include a complementary metal oxide semiconductor (CMOS) image sensor, a charged coupled device (CCD) image sensor, or the like. The plurality of frame images may be directly provided to the image processing device 1060, or may be stored in the memory device 1030 and provided to the image processing device 1060. The image processing device 1060 may be one of the image processing device 100 of FIG. 8 and the image processing device 100a of FIG. 19, and may operate according to example embodiments described with reference to FIGS. 1 through 19. In some example embodiments, the image processing device 1060 may be included in the processor 1010.

The example embodiments of the inventive concepts may be applied to various electronic devices and systems including the image processing devices and systems. For example, the example embodiments of the inventive concepts may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of image processing a video image including a plurality of frame images, the method comprising:
   generating a first high dynamic range (HDR) image based on a first frame image and a second frame image of the plurality of frame images by (i) determining an amount of movement between the first frame image and the second frame image, (ii) shifting the first frame image or an object therein based on the amount of movement to generate a shifted first frame image, and (iii) combining the shifted first frame image and the second frame image, the second frame image being subsequent in time to the first frame image in the plurality of frame images, the first frame image having a first exposure time, the second frame image having a second exposure time different from the first exposure time; and
   generating a second HDR image based on the second frame image and a third frame image of the plurality of frame images by (i) determining an amount of movement between the second frame image and the third frame image, (ii) shifting the second frame image or an object therein based on the amount of movement to generate a shifted second frame image, and (iii) combining the shifted second frame image and the third frame image, the third frame image being subsequent in time to the second frame image in the plurality of frame images, the third frame image having the first exposure time.

2. The method of claim 1, wherein a number of the plurality of frame images received before the image processing is equal to a number of a plurality of HDR images obtained after the image processing, the first HDR image and the second HDR image being included in the plurality of HDR images.

3. The method of claim 1, further comprising:
   generating a third HDR image based on the third frame image and a fourth frame image of the plurality of frame images, the fourth frame image being subsequent in time to the third frame image in the plurality of frame images, the fourth frame image having the second exposure time.

4. The method of claim 1, further comprising:
   outputting a start frame image as a start HDR image without performing the image processing on the start frame image, the start frame image being at a head of the plurality of frame images.

5. The method of claim 1, wherein the determining the amount of movement includes:
   extracting a global movement between the first frame image and the second frame image.

6. The method of claim 1, wherein the determining the amount of movement includes:
   extracting a local movement for the object between the first frame image and the second frame image, the object being included in both the first frame image and the second frame image.

7. The method of claim 1, wherein
   the generating the first HDR image generates the first HDR image based on the first frame image, the second frame image and a fourth frame image of the plurality of frame images between the second frame image and the third frame image, the fourth frame image having a third exposure time different from the first exposure time and the second exposure time, and
   the generating the second HDR image generates the second HDR image based on the second frame image, the third frame image, and the fourth frame image.

8. The method of claim 7, further comprising:
   generating a third HDR image based on the third frame image, the fourth frame image and a fifth frame image of the plurality of frame images, the fifth frame image being subsequent in time to the third frame image in the plurality of frame images, the fifth frame image having the second exposure time.

9. The method of claim 7, further comprising:
   outputting a start frame image of the plurality of frame images as a start HDR image without performing the image processing, the start frame image being at a head of the plurality of frame images; and
   generating a second start HDR image by combining the start frame image and a second start frame image of the plurality of frame images that is immediately after the start frame image.

10. An image processing device configured to perform image processing on a video image including a plurality of frame images, the plurality of frame images including a first frame image, a second frame image and a third frame image, the image processing device comprising:
    a first frame buffer configured to,
      receive the first frame image, the first frame image having a first exposure time, and
      receive the third frame image, the third frame image being subsequent in time to the second frame image in the plurality of frame images, the third frame image having the first exposure time;
    a second frame buffer configured to receive the second frame image, the second frame image being subsequent in time to the first frame image in the plurality of frame images, the second frame image having a second exposure time different from the first exposure time; and
    a high dynamic range (HDR) processor configured to,
      generate a first HDR image based on the first frame image and the second frame image by (i) determining an amount of movement between the first frame image and the second frame image, (ii) shifting the first frame image or an object therein based on the amount of movement to generate a shifted first frame image, and (iii) combining the shifted first frame image and the second frame image, and generate a second HDR image based on the second frame image and the third frame image by (i) determining an amount of movement between the second frame image and the third frame image, (ii) shifting the second frame image or an object therein based on the amount of movement to generate a shifted second frame image, and (iii) combining the shifted second frame image and the third frame image.

11. The image processing device of claim 10, further comprising:

a third frame buffer configured to receive a fourth frame image of the plurality of frame images between the second frame image and the third frame image, the fourth frame image having a third exposure time different from the first exposure time and the second exposure time, wherein the HDR processor is configured to, generate the first HDR image by combining the first frame image, the second frame image and the fourth frame image, and generate the second HDR image by combining the second frame image, the third frame image and the fourth frame image.

12. The image processing device of claim 10, wherein a number of frame buffers that are included in the image processing device is equal to a number of exposure times that are included in the plurality of frame images.

* * * * *